ID1566B2

United States Patent
Ozluturk

(10) Patent No.: US 10,341,566 B2
(45) Date of Patent: *Jul. 2, 2019

(54) METHOD AND APPARATUS FOR IMPLEMENTING A DIGITAL GRADUATED FILTER FOR AN IMAGING APPARATUS

(71) Applicant: Fatih M. Ozluturk, Sands Point, NY (US)

(72) Inventor: Fatih M. Ozluturk, Sands Point, NY (US)

(73) Assignee: CLEAR IMAGING RESEARCH, LLC, Sands Point, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/811,171

(22) Filed: Nov. 13, 2017

(65) Prior Publication Data

US 2018/0070012 A1 Mar. 8, 2018

Related U.S. Application Data

(63) Continuation of application No. 14/861,731, filed on Sep. 22, 2015, now Pat. No. 9,826,159, which is a
(Continued)

(51) Int. Cl.
*G06T 5/00* (2006.01)
*H04N 5/232* (2006.01)
*H04N 5/235* (2006.01)

(52) U.S. Cl.
CPC ......... *H04N 5/23277* (2013.01); *G06T 5/003* (2013.01); *H04N 5/2355* (2013.01);
(Continued)

(58) Field of Classification Search
CPC .......... H04N 5/23254; H04N 5/23248; H04N 5/23258; H04N 5/23267; H04N 5/23287;
(Continued)

(56) References Cited

U.S. PATENT DOCUMENTS

| | | | |
|---|---|---|---|
| 4,612,575 A | 9/1986 | Ishman et al. | |
| 4,646,274 A | 2/1987 | Martinez | |

(Continued)

FOREIGN PATENT DOCUMENTS

| | | |
|---|---|---|
| EP | 1004983 | 5/2000 |
| JP | 11-024122 | 1/1999 |

(Continued)

OTHER PUBLICATIONS

Banham, et al., Digital Image Restoration, IEEE Signal Processing Magazine, Mar. 1997, pp. 24-41.
(Continued)

*Primary Examiner* — Daniel M Pasiewicz
(74) *Attorney, Agent, or Firm* — Volpe and Koenig, P.C.

(57) ABSTRACT

A digital graduated filter is implemented in an imaging device by combining multiple images of the subject wherein the combining may include combining different numbers of images for highlights and for shadows of the subject. The imaging device may present a user with a set of pre-defined graduated filter configurations to choose from. A user may also specify the direction of graduation and strength of graduation in a viewfinder. In an alternative implementation, combining may include scaling of pixels being added instead of varying the number of images being combined. In an alternative implementation, the combining of multiple images may include combining a different number of images for highlights of the subject than for shadows of subject.

20 Claims, 18 Drawing Sheets

Related U.S. Application Data continuation-in-part of application No. 14/679,551, filed on Apr. 6, 2015, now Pat. No. 9,392,175, which is a continuation of application No. 13/653,144, filed on Oct. 16, 2012, now Pat. No. 9,001,221, which is a continuation of application No. 13/442,370, filed on Apr. 9, 2012, now Pat. No. 8,922,663, which is a continuation of application No. 12/274,032, filed on Nov. 19, 2008, now Pat. No. 8,154,607, which is a continuation of application No. 11/089,081, filed on Mar. 24, 2005, now Pat. No. 8,331,723.

(60) Provisional application No. 60/556,230, filed on Mar. 25, 2004.

(52) U.S. Cl.
CPC ..... *H04N 5/23248* (2013.01); *H04N 5/23254* (2013.01); *H04N 5/23258* (2013.01); *H04N 5/23267* (2013.01); *H04N 5/23287* (2013.01); *G06T 2207/10016* (2013.01); *G06T 2207/20201* (2013.01)

(58) Field of Classification Search
CPC .. H04N 5/2355; H04N 7/183; H04N 5/23277; G06T 5/003; G06T 2207/10016; G06T 2207/20201
See application file for complete search history.

(56) References Cited

U.S. PATENT DOCUMENTS

| | | |
|---|---|---|
| 4,890,160 A | 12/1989 | Thomas |
| 5,060,074 A | 10/1991 | Kinugasa et al. |
| 5,125,041 A | 6/1992 | Kimura et al. |
| 5,170,255 A | 12/1992 | Yamada et al. |
| 5,189,518 A | 2/1993 | Nishida |
| 5,193,124 A | 3/1993 | Subbarao |
| 5,262,867 A | 11/1993 | Kojima |
| 5,264,846 A | 11/1993 | Oikawa |
| 5,291,300 A | 3/1994 | Ueda |
| 5,365,603 A | 11/1994 | Karmann |
| 5,510,831 A | 4/1996 | Mayhew |
| 5,596,366 A | 1/1997 | Takashima et al. |
| 5,627,543 A | 5/1997 | Moreira |
| 5,649,032 A | 7/1997 | Burt et al. |
| 5,652,918 A | 7/1997 | Usui |
| 5,666,158 A | 9/1997 | Sekine et al. |
| 5,684,887 A | 11/1997 | Lee et al. |
| 5,706,402 A | 1/1998 | Bell |
| 5,706,416 A | 1/1998 | Mann et al. |
| 5,712,474 A | 1/1998 | Naneda |
| 5,729,290 A | 3/1998 | Tokumitsu et al. |
| 5,734,739 A | 3/1998 | Sheehan et al. |
| 5,771,403 A | 6/1998 | Imada |
| 5,867,213 A | 2/1999 | Ouchi |
| 5,889,553 A | 3/1999 | Kino et al. |
| 5,963,675 A | 10/1999 | Van der Wal et al. |
| 5,982,421 A | 11/1999 | Inou et al. |
| 5,990,942 A | 11/1999 | Ogino |
| 6,067,367 A | 5/2000 | Nakajima et al. |
| 6,075,905 A | 6/2000 | Herman et al. |
| 6,079,862 A | 6/2000 | Kawashima et al. |
| 6,097,854 A | 8/2000 | Szeliski et al. |
| 6,101,238 A | 8/2000 | Murthy et al. |
| 6,124,864 A | 9/2000 | Madden et al. |
| 6,157,733 A | 12/2000 | Swain |
| 6,166,384 A | 12/2000 | Dentinger et al. |
| 6,166,853 A | 12/2000 | Sapia et al. |
| 6,191,813 B1 | 2/2001 | Fujisaki et al. |
| 6,195,460 B1 | 2/2001 | Kobayashi et al. |
| 6,198,283 B1 | 3/2001 | Foo et al. |
| 6,208,765 B1 | 3/2001 | Bergen |
| 6,249,616 B1 | 6/2001 | Hashimoto |
| 6,278,460 B1 | 8/2001 | Myers et al. |
| 6,292,593 B1 | 9/2001 | Nako et al. |
| 6,342,918 B1 | 1/2002 | Inou et al. |
| 6,349,114 B1 | 2/2002 | Mory |
| 6,353,689 B1 | 3/2002 | Kanamaru et al. |
| 6,353,823 B1 | 3/2002 | Kumar |
| 6,384,975 B1 | 5/2002 | Hayakawa |
| 6,385,398 B1 | 5/2002 | Matsumoto |
| 6,392,696 B1 | 5/2002 | Onuki |
| 6,466,262 B1 | 10/2002 | Miyatake et al. |
| 6,470,100 B2 | 10/2002 | Horiuchi et al. |
| 6,512,807 B1 | 1/2003 | Pohlman et al. |
| 6,583,823 B1 | 6/2003 | Shimada et al. |
| 6,650,704 B1 | 11/2003 | Carlson et al. |
| 6,687,458 B2 | 2/2004 | Masuda |
| 6,745,066 B1 | 6/2004 | Lin et al. |
| 6,757,434 B2 | 6/2004 | Miled et al. |
| 6,759,979 B2 | 7/2004 | Vashisth et al. |
| 6,781,623 B1 | 8/2004 | Thomas |
| 6,784,927 B1 | 8/2004 | Itokawa |
| 6,909,914 B2 | 6/2005 | Pedrizzetti et al. |
| 6,930,708 B1 | 8/2005 | Sato et al. |
| 6,993,157 B1 | 1/2006 | Oue et al. |
| 6,993,204 B1 | 1/2006 | Yahil et al. |
| 7,024,050 B2 | 4/2006 | Kondo et al. |
| 7,075,569 B2 | 7/2006 | Niikawa |
| 7,162,102 B2 | 1/2007 | Cahill et al. |
| 7,286,164 B2 | 10/2007 | Shinohara et al. |
| 7,298,923 B2 | 11/2007 | Zhang et al. |
| 7,352,389 B2 | 4/2008 | Uenaka |
| 7,397,500 B2 | 7/2008 | Yost et al. |
| 7,483,056 B2 | 1/2009 | Shinohara et al. |
| 7,489,760 B2 | 2/2009 | Hemmendorff |
| 7,561,186 B2 | 7/2009 | Poon |
| 7,693,563 B2 | 4/2010 | Suresh et al. |
| 7,710,460 B2 | 5/2010 | Stavely et al. |
| 7,961,323 B2 | 6/2011 | Tibbetts |
| 8,228,400 B2 | 7/2012 | Liu et al. |
| 8,259,184 B2 | 9/2012 | Murashima et al. |
| 8,798,388 B2 | 8/2014 | Atanassov et al. |
| 9,826,159 B2 * | 11/2017 | Ozluturk ............. H04N 5/2355 |
| 2001/0010546 A1 | 8/2001 | Chen |
| 2001/0028798 A1 | 10/2001 | Manowitz et al. |
| 2001/0045989 A1 | 11/2001 | Onuki |
| 2002/0036692 A1 | 3/2002 | Okada |
| 2002/0094200 A1 | 7/2002 | Yamaguchi |
| 2002/0097324 A1 | 7/2002 | Onuki |
| 2002/0110268 A1 | 8/2002 | Brinker et al. |
| 2002/0159651 A1 | 10/2002 | Tener et al. |
| 2003/0067544 A1 | 4/2003 | Wada |
| 2003/0076408 A1 | 4/2003 | Dutta |
| 2003/0113035 A1 | 6/2003 | Cahill et al. |
| 2003/0118227 A1 | 6/2003 | Winsor et al. |
| 2003/0174899 A1 | 9/2003 | Kondo et al. |
| 2004/0008872 A1 | 1/2004 | Goldberg et al. |
| 2004/0080661 A1 | 4/2004 | Afsenius et al. |
| 2004/0091158 A1 | 5/2004 | Miled et al. |
| 2004/0100561 A1 | 5/2004 | Shinohara et al. |
| 2004/0145673 A1 | 7/2004 | Washisu |
| 2004/0170327 A1 | 9/2004 | Kim et al. |
| 2004/0218055 A1 | 11/2004 | Yost et al. |
| 2005/0078881 A1 | 4/2005 | Xu et al. |
| 2005/0140793 A1 | 6/2005 | Kojima et al. |
| 2005/0157180 A1 | 7/2005 | Takahashi et al. |
| 2005/0179784 A1 | 8/2005 | Qi |
| 2005/0213850 A1 | 9/2005 | Zhang et al. |
| 2005/0231603 A1 | 10/2005 | Poon |
| 2005/0286388 A1 | 12/2005 | Ayres et al. |
| 2006/0177145 A1 | 8/2006 | Lee et al. |
| 2006/0257051 A1 | 11/2006 | Zavadsky et al. |
| 2006/0280249 A1 | 12/2006 | Poon |
| 2007/0025503 A1 | 2/2007 | Hemmendorff |
| 2007/0031004 A1 | 2/2007 | Matsui et al. |
| 2007/0086675 A1 | 4/2007 | Chinen et al. |
| 2007/0236573 A1 | 10/2007 | Alon et al. |
| 2007/0263914 A1 | 11/2007 | Tibbetts |
| 2008/0123996 A1 | 5/2008 | Zavadsky et al. |
| 2010/0231748 A1 * | 9/2010 | Takeda ..................... G03B 5/00 348/229.1 |

(56) References Cited

U.S. PATENT DOCUMENTS

| | | |
|---|---|---|
| 2010/0328482 A1* | 12/2010 | Chang .................. G06T 5/50 |
| | | 348/222.1 |
| 2011/0228123 A1 | 9/2011 | Matsumoto et al. |
| 2012/0128202 A1* | 5/2012 | Shimizu ............ H04N 5/23277 |
| | | 382/103 |
| 2014/0313367 A1* | 10/2014 | Iwasaki ............... H04N 5/2351 |
| | | 348/222.1 |
| 2015/0103190 A1 | 4/2015 | Corcoran et al. |
| 2015/0262341 A1* | 9/2015 | Nash ................. H04N 5/23229 |
| | | 348/208.6 |
| 2016/0117829 A1 | 4/2016 | Yoon et al. |
| 2016/0127641 A1 | 5/2016 | Gove |

FOREIGN PATENT DOCUMENTS

| | | |
|---|---|---|
| JP | 2000-207538 | 7/2000 |
| JP | 2004-056581 | 2/2004 |
| JP | 2004-104652 | 4/2004 |

OTHER PUBLICATIONS

Biemond et al., "Iterative Methods for Image Deblurring," Proceedings of the IEEE, May 1990, vol. 78, No. 5.

Kundur, et al., Blind Image Deconvolution, IEEE Signal Processing Magazine, May 1996, pp. 43-64.

Yitzhaky, et al., Comparison of Direct Blind Deconvolution Methods for Motion-Blurred Images, Applied Optics, vol. 38, No. 20, Jul. 1999, pp. 4325-4332.

Canon, 8mm Video Camcorder Instruction Manual, ES190/ES290, PUB.DIM-297 (1999).

* cited by examiner

| r(n+N,m+M) | ... |          | r(n,m+M) |          | ... | r(n-N,m+M) |
|------------|-----|----------|----------|----------|-----|------------|
|            |     |          | ...      |          |     |            |
|            |     |          | r(n,m+1) |          |     |            |
| r(n+N,m)   | ... | r(n+1,m) | r(n,m) | r(n-1,m) | ... | r(n-N,m)  |
|            |     |          | r(n,m-1) |          |     |            |
|            |     |          | ...      |          |     |            |
| r(n+N,m)   | ... |          | r(n,m-M) |          | ... | r(n-N,m-M) |

Figure 1

| w(N,M) | ... |        | w(0,M)   |         | ... | w(-N,M)  |
|--------|-----|--------|----------|---------|-----|----------|
|        |     |        | ...      |         |     |          |
|        |     |        | w(0,1)   |         |     |          |
| w(N,0) | ... | w(1,0) | w(0,0) | w(-1,0) | ... | w(-N,0) |
|        |     |        | w(0,-1)  |         |     |          |
|        |     |        | ...      |         |     |          |
| w(N,0) | ... |        | w(0,-M)  |         | ... | w(-N,-M) |

Figure 2

| r(n+N+1,m+M) | ... |          | r(n+1,m+M) |          | ... | r(n-N+1,m+M) |
|--------------|-----|----------|------------|----------|-----|--------------|
|              |     |          | ...        |          |     |              |
|              |     |          | r(n+1,m+1) |          |     |              |
| r(n+N+1,m)   | ... | r(n+2,m) | r(n+1,m) | r(n,m) | ... | r(n-N+1,m)  |
|              |     |          | r(n+1,m-1) |          |     |              |
|              |     |          | ...        |          |     |              |
| r(n+N+1,m)   | ... |          | r(n+1,m-M) |          | ... | r(n-N+1,m-M) |

Figure 3

Subject          Image sensor

Select a graduated filter

Rotate to select graduated filter orientation

Rotate left - right

METHOD AND APPARATUS FOR IMPLEMENTING A DIGITAL GRADUATED FILTER FOR AN IMAGING APPARATUS

CROSS REFERENCE TO RELATED APPLICATION

This application is a continuation of U.S. patent application Ser. No. 14/861,731 filed Sep. 22, 2015, which is a continuation in part of U.S. patent application Ser. No. 14/679,551 filed on Apr. 6, 2015, which issued as U.S. Pat. No. 9,392,175 on Jul. 12, 2016, which is a continuation of U.S. patent application Ser. No. 13/653,144, filed on Oct. 16, 2012, which was issued as U.S. Pat. No. 9,001,221 on Apr. 7, 2015, which is a continuation of U.S. patent application Ser. No. 13/442,370, filed on Apr. 9, 2012, which issued as U.S. Pat. No. 8,922,663 on Dec. 30, 2014, which is a continuation of U.S. patent application Ser. No. 12/274,032, filed on Nov. 19, 2008, which issued as U.S. Pat. No. 8,154,607 on Apr. 10, 2012, which is a continuation of U.S. patent application Ser. No. 11/089,081, filed on Mar. 24, 2005, which issued as U.S. Pat. No. 8,331,723 on Dec. 11, 2012, which claims the benefit of U.S. Provisional Application Ser. No. 60/556,230, filed on Mar. 25, 2004, the contents of each of which are incorporated by reference herein as if fully set forth.

FIELD OF INVENTION

The present invention generally relates to digital image processing. More specifically, this invention relates to processing of digitized image data in order to correct for image distortion caused by relative motion between the imaging device and the subject at the time of image capture, or by optical distortion from other sources. This invention also relates to improving image quality, improving color and light dynamic range, and enhancing images through signal processing.

BACKGROUND

When capturing images, as with a camera, it is desirable to capture images without unwanted distortion. In general, sources of unwanted distortion may be characterized as equipment errors and user errors. Examples of common equipment errors include inadequate or flawed optical equipment, and undesirable characteristics of the film or other recording media. Using equipment and media of a quality that is suitable for a particular photograph may help mitigate the problems associated with the equipment and the recording medium, but in spite of this, image distortion due to equipment errors may still appear.

Another source of image distortion is user error. Examples of common user errors include poor image processing, and relative motion between the imaging device and the subject of the image. For example, one common problem that significantly degrades the quality of a photograph is the blur that results from camera movement (i.e. shaking) at the time the photograph is taken. This may be difficult to avoid, especially when a slow shutter speed is used, such as in low light conditions, or when a large depth of field is needed and the lens aperture is small. Similarly, if the subject being photographed is moving, use of a slow shutter speed may also result in image blur.

There are currently many image processing techniques that are used to improve the quality, or "correctness," of a photograph. These techniques are applied to the image either at the time it is captured by a camera, or later when it is post-processed. This is true for both traditional "hardcopy" photographs that are chemically recorded on film, and for digital photographs that are captured as digital data, for example using a charged couple device (CCD) or a CMOS sensor. Also, hardcopy photographs may be scanned and converted into digital data, and are thereby able to benefit from the same digital signal processing techniques as digital photographs.

Commonly used post-processing techniques for digitally correcting blurred images typically involve techniques that seek to increase the sharpness or contrast of the image. This may give the mistaken impression that the blur is remedied. However, in reality, this process causes loss of data from the original image, and also alters the nature of the photograph. Thus, current techniques for increasing the sharpness of an image do not really "correct" the blur that results from relative motion between a camera and a subject being photographed. In fact, the data loss from increasing the sharpness may result in a less accurate image than the original. Therefore, a different method that actually corrects the blur is desirable.

In the prior art, electro-mechanical devices for correcting image blur due to camera motion are built into some high quality lenses, variously called "image stabilization", "vibration reduction", or similar names by camera/lens manufacturers. These devices seek to compensate for the camera/lens movement by moving one or more of the lens elements; hence countering the effect of the motion. Adding such a device to a lens typically makes the lens much more expensive, heavier and less sturdy, and may also compromise image quality.

Accordingly, it is desirable to have a technique that corrects for distortion in photographs without adding excessively to the price, robustness or weight of a camera or other imaging device, or adversely affecting image quality.

An additional limitation of current digital imaging devices is that the dynamic range of the image sensors are not adequate to capture both shadows and highlights with detail. As a result, many digital photographs result in washed out highlights or completely dark shadows that are devoid of detail. In traditional film photography these problems are experienced less because most types of film have larger dynamic range compared to digital image sensors.

One remedy in dealing with subjects with large dynamic range has traditionally been the use of graduated filters. These are glass filters that are attached in front of a lens to limit the light coming into the lens from certain areas of the subject. These filters in effect compress the dynamic range of the light coming from the subject. For example, if a scene includes a dark meadow below and a very light sky above, a graduated filter that limits light going through it in the upper part of the image reduces the light intensity for the highlights and "compresses" the light dynamic range of the scene. In this way, both highlights, such as the sky, and the shadows, such as the dark meadow, are captured by the camera with detail. Although graduated filters help in many high-dynamic-range scenes, they are not convenient. A person has to carry along one or more graduated filters for each lens, and adjust the orientation of the graduation by rotating the filter every time a picture is taken.

Accordingly, it is desirable to have a technique that enables digital imaging devices to capture subjects with large dynamic ranges, without requiring use of external graduated filters.

SUMMARY

The present system and method process image data in order to correct an image for distortion caused by imager movement or by movement of the subject being imaged. In another embodiment, the present invention may prevent image distortion due to motion of the imaging device or subject at relatively slow shutter speeds, resulting in a substantially undistorted image.

In another embodiment, the system and method measure relative motion between the imaging device and the subject by using sensors that detect the motion. When an image is initially captured, the effect of relative motion between the imaging device and the subject is that it transforms the "true image" into a blurred image, according to a 2-dimensional transfer function defined by the motion. The system and method determine a transfer function that represents the motion and corrects the blur.

In yet another embodiment, the transfer function is estimated using blind detection techniques. The transfer function is then inverted, and the inverted function is implemented in an image correcting filter that essentially reverses the blurring effect of the motion on the image. The image is processed through the filter, wherein blur due to the motion is reversed, and the true image is recovered.

In yet another embodiment, the invention uses the transfer function to combine consecutive images taken at a fast shutter speed to avoid blur due to motion between camera and subject that could result from using a slow shutter speed. In still another embodiment, the image sensor is moved to counter camera motion while the image is being captured.

In yet another embodiment, the invention uses consecutive images taken of the subject to overcome distortions due to limited dynamic range of the image sensor. By selectively combining consecutive images, the invention creates an improved resulting image that renders highlights and shadows with detail, which would otherwise fall outside the dynamic range of image sensor.

BRIEF DESCRIPTION OF THE DRAWINGS

FIG. 1 is a portion of memory having memory locations wherein elements of a recorded image are stored.

FIG. 2 is a portion of memory having memory locations wherein elements of a deconvolution filter are stored.

FIG. 3 is a portion of memory having memory locations wherein the recorded image is stored for calculating the next value of a corrected image.

DETAILED DESCRIPTION OF THE PREFERRED EMBODIMENTS

Figure 4:
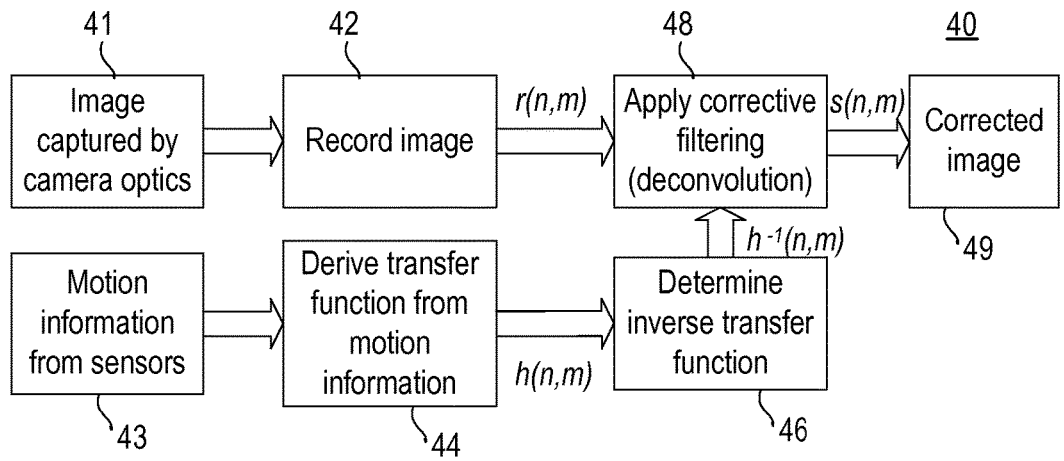
FIG. 4 is a functional block diagram of a system for correcting an image for distortion using a transfer function representing the distortion, wherein the transfer function is derived from measurements of the motion that caused the distortion.

The present apparatus, system and method will be described with reference to the figures wherein like numerals represent like elements throughout. Although hereinafter described as an apparatus, system and method of correcting for image distortion due to the shaking of a camera when a picture is taken, similar distortions may also be caused by other types of imaging equipment and by imperfections in photo processing equipment, movement of the subject being photographed, and other sources. The present apparatus, system and method may also be applied to correct for these types of distortions.

Saturation of the imaging device is another problem that results in sub-optimal image quality. The present apparatus, system and method may be utilized to correct for these types of distortions as well.

Although reference is made throughout the specification to a camera as the exemplary imaging device, the present invention is not limited to such a device. As aforementioned, the teachings of the present invention may be applied to any type of imaging device, as well as image post-processing techniques.

For sake of clarity, a camera may be a stand-alone photography equipment, as well as a function included in another electronic device such as a smartphone, tablet computer, a wearable electronic device, or other personal communication or personal computing device.

Capturing and recording a photograph, for example by a camera, involves gathering the light reflected or emanating from a subject, passing it through an optical system, such as one or more lenses, and directing it onto a light sensitive recording medium. A typical recording medium in traditional analog photography is a film that is coated with light sensitive material. During processing of the exposed film, the image is fixed and recorded. In digital cameras, the recording medium is typically a dense arrangement of light sensors, such as a Charge-Coupled Device (CCD) or a CMOS sensor.

The recording medium continuously captures the impression of the light that falls upon it as long as the camera shutter is open. Therefore, if the camera and the subject are moving with respect to each other (such as in the case when the user is unsteady and is shaking the camera, or when the subject is moving), the recorded image becomes blurred. To reduce this effect, a fast shutter speed may be used, thereby reducing the amount of motion occurring while the shutter is open. However, this reduces the amount of light from the subject captured on the recording medium, which may adversely affect image quality. In addition, increasing the shutter speed beyond a certain point is not always practical. Therefore, undesired motion blur occurs in many pictures taken by both amateur and professional photographers.

The nature of the blur is that the light reflected from a reference point on the subject does not fall on a single point on the recording medium, but rather it "travels" across the recording medium. Thus a spread-out, or smudged, representation of the reference point is recorded.

Generally, all points of the subject move together, and the optics of the camera and the recording medium also move together. For example, in the case of a photograph of a moving car, wherein an image of the car is blurred due to uniform motion of all parts of the car. In other words, the image falling on the recording medium "travels" uniformly across the recording medium, and all points of the subject blur in the same manner.

The nature of the blur resulting from uniform relative motion may be expressed mathematically. In a 2-dimensional space with discrete coordinate indices 'n' and 'm', the undistorted image of the subject may be represented by $s(n,m)$, and a transfer function $h(n,m)$ may be used to represent the blur. Note that $h(n,m)$ describes the way the image "travels" on the recording medium while it is captured. The resulting image that is recorded, $r(n,m)$, is given by:

$$r(n,m) = s(n,m) ** h(n,m); \quad \text{Equation (1)}$$

where ** represents 2-dimensional convolution. The mathematical operation of convolution is well known to those skilled in the art and describes the operation:

$$r(n, m) = \sum_{i=-\infty}^{\infty} \sum_{j=-\infty}^{\infty} h(i, j) s(n-i, m-j). \quad \text{Equation (2)}$$

In the sum operations in Equation (2), the summation limits are infinite. In practice, the summations are not infinite, since the support region of the transfer function is finite. In other words, the region where the function is non-zero is limited by the time the camera shutter is open and the amount of motion. Therefore, the summation is calculated for only the indices of the transfer function where the function itself is non-zero, for example, from i=−N . . . N and j=−M . . . M.

If the transfer function $h(n,m)$ is known, or its estimate is available, the blur that it represents may be "undone" or compensated for in a processor or in a computer program, and a corrected image may be obtained, as follows. Represent the "reverse" of the transfer function $h(n,m)$ as $h^{-1}(n,m)$ such that:

$$h(n,m) ** h^{-1}(n,m) = \delta(n,m); \quad \text{Equation (3)}$$

where $\delta(n,m)$ is the 2-dimensional Dirac delta function, which is:

$$\delta(n, m) = \begin{cases} 1 & \text{if } n = m = 0 \\ 0 & \text{otherwise} \end{cases} \quad \text{Equation (4)}$$

The delta function has the property that when convolved with another function, it does not change the nature of that function. Therefore, once $h(n,m)$ and hence $h^{-1}(n,m)$ are known, an image $r(n,m)$ may be put through a correcting filter, called a "deconvolution filter", which implements the inverse transfer function $w(n,m)=h^{-1}(n,m)$ and undoes the effect of blur. Then:

$$\begin{aligned} r(n, m)  w(n, m) &= r(n, m)  h^{-1}(n, m) \quad \text{Equation (5)} \\ &= s(n, m)  h(n, m)  h^{-1}(n, m) \\ &= s(n, m) ** \delta(n, m) \\ &= s(n, m); \end{aligned}$$

and the correct image data $s(n,m)$ is recovered.

The deconvolution filter in this example is such that:

$$\sum_{i=-N}^{N} \sum_{j=-M}^{M} w(i, j) h(n-i, m-j) = \begin{cases} 1 & \text{if } n = m = 0 \\ 0 & \text{otherwise} \end{cases} \quad \text{Equation (6)}$$

Because of the property that the deconvolution operation forces the output of the convolution to be zero for all but one index, this method is called the "zero-forcing algorithm". The zero-forcing algorithm itself is but one method that may be used, but there are others possible also, such as the least mean-square algorithm described in more detail below.

In order to define a deconvolution filter, the transfer function $h(n,m)$ representing the relative motion between the imager and the subject must be derived from measuring the motion, or alternatively by using blind estimation techniques. The inverse function $h^{-1}(n,m)$ must then be calculated and incorporated in a filter to recover a corrected image $s(n,m)$. It is possible to determine $h(n,m)$ using sensors that detect motion, and record it at the time the image is captured.

One embodiment of the present invention includes one or more motion sensors, attached to or included within the imager body, the lens, or otherwise configured to sense any motion of the imager while an image is being captured, and to record this information. Such sensors are currently commercially available which are able to capture movement in a single dimension, and progress is being made to improve their accuracy, cost, and characteristics. To capture motion in two dimensions, two sensors may be used, each capable of detecting motion in a single direction. Alternatively, a sensor able to detect motion in more than one dimension may be used.

The convolution in Equation (5) may be performed using memory elements, by performing an element-by-element multiplication and summation over the support region of the transfer function. The recorded image is stored, at least temporarily, in memory elements forming a matrix of values such as shown in FIG. 1. Similarly, the deconvolution filter w(n,m) is stored in another memory location as shown in FIG. 2. The deconvolution operation is then performed by multiplying the values in the appropriate memory locations on an element-by-element basis, such as multiplying r(n,m) and w(0,0); r(n−1,m) and w(1,0), and so on, and summing them all up.

Element-by-element multiplication and summing results in the convolution:

$$y(n, m) \sum_{i=-N}^{N} \sum_{j=-M}^{M} w(i, j)r(n-i, m-j). \quad \text{Equation (7)}$$

To calculate the next element, y(n+1,m) for example, the deconvolution filter w(n,m) multiplies the shifted memory locations, such as shown in FIG. 3, followed by the summation. Note that the memory locations do not need to be shifted in practice; rather, the pointers indicating the memory locations would move. In FIG. 1 and FIG. 3 portions of r(n,m) are shown that would be included in the element-by-element multiplication and summation, and this portion is the same size as w(n,m). However, it should be understood that r(n,m), that is the whole image, is typically much larger than the support region of w(n,m). To determine value of the convolution for different points, an appropriate portion of r(n,m) would be included in the calculations.

The filter defined by Equation (5) is ideal in the sense that it reconstructs the corrected image from the blurred image with no data loss. A first embodiment calculates the inverse of h(n,m) where h(n,m) is known. As explained above, by making use of motion detecting devices, such as accelerometers, the motion of the imager (such as a camera and/or the associated lens) may be recorded while the picture is being captured, and the motion defines the transfer function describing this motion.

A functional block diagram of this embodiment in accordance with the present invention is illustrated in FIG. 4, wherein a method 40 for correcting image distortion is shown. An image r(n,m) from camera optics is captured by an imager (step 41) and recorded in memory (step 42). Simultaneously, motion sensors detect and record camera motion (step 43) that occurs while the shutter of the camera is open. The transfer function representing the motion h(n,m) is derived (step 44), and the inverse transfer function h⁻¹(n,m) is determined (step 46). The inverse transfer function is applied in a corrective filter (step 48) to the image, which outputs a corrected image s(n,m) (step 49).

In this and other embodiments that make use of motion sensors to represent the imager's movement, derivation of the transfer function from motion information (step 44) takes into account the configuration of the imager and the lens also. For an imager that is a digital camera, for example, the focal length of the lens factors into the way the motion of the imager affects the final image. Therefore the configuration of the imager is part of the derivation of h(n,m). This is important especially for imagers with varying configurations, such as digital cameras with interchangeable lenses.

In this first embodiment of the apparatus, system and method, an iterative procedure is used to compute the inverse transfer function from h(n,m). The approximate inverse transfer function at iteration k is denoted as $\hat{h}_k^{-1}(n,m)$. At this iteration, output of the deconvolution filter is:

$$y_k(n, m) = \hat{h}_k^{-1}(n, m) ** r(n, m) \quad \text{Equation (8)}$$
$$= \sum_i \sum_j \hat{h}_k^{-1}(i, j)r(n-i, m-j).$$

The filter output may be written as the sum of the ideal term and the estimation noise as:

$$y_k(n, m) = h^{-1}(n, m) ** r(n, m) + \quad \text{Equation (9)}$$
$$(\hat{h}_k^{-1}(n, m) - h^{-1}(n, m)) ** r(n, m)$$
$$= s(n, m) + v_k(n, m);$$

where υ(n,m) is the estimation noise which is desirable to eliminate. An initial estimate of the correct image may be written as:

$$\hat{s}_k(n,m) = \hat{h}_k^{-1}(n,m) ** r(n,m), \quad \text{Equation (10)}$$

Figure 6:
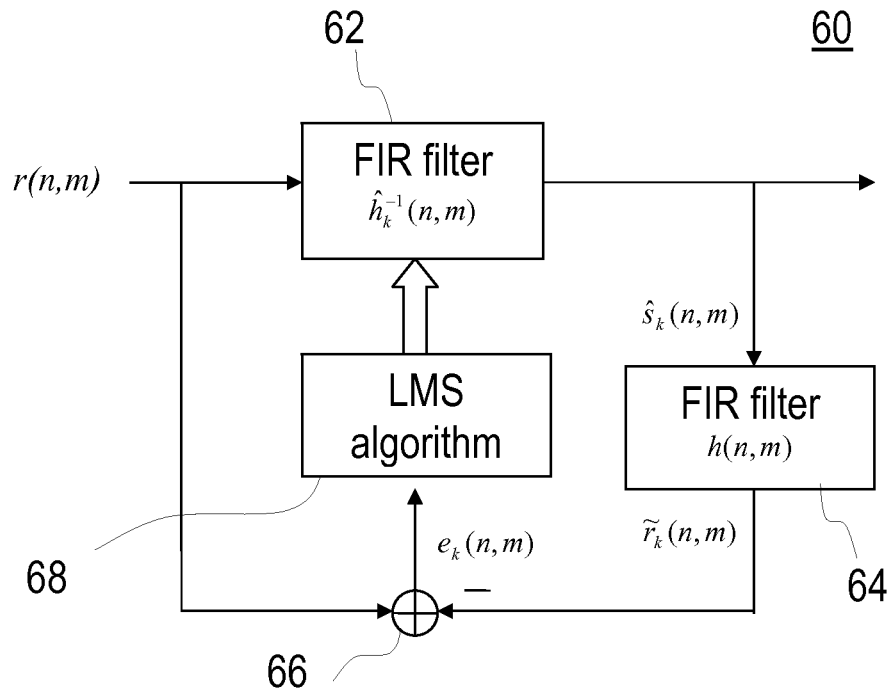
FIG. 6 shows a unit for iterative calculation of the corrective filter coefficients and estimation of the correct image data.

However, this estimate may in general be iteratively improved. There are a number of currently known techniques described in estimation theory to achieve this. A preferable option is the Least Mean-Square (LMS) algorithm. A block diagram of a calculation unit 60 which implements this method is shown in FIG. 6.

As an initial state, $\hat{h}^{-1}_0(n,m)$ is set to equal μr(n,m). Then, the following steps are iteratively repeated:

Step 1, an estimate of the correct image is calculated in a first 2-dimensional finite impulse response (2D FIR) filter 62:

$$\hat{s}_k(n,m) = \hat{h}_k^{-1}(n,m) ** r(n,m).$$

Step 2, a received signal based on the estimated correct image is calculated in a second 2D FIR filter 64:

$$\tilde{r}_k(n,m) = \hat{s}_k(n,m) ** h(n,m);$$

and the estimation error is calculated using an adder 66:

$$e_k(n,m) = r_k(n,m) - \tilde{r}_k(n,m).$$

Step 3, the inverse transfer function coefficients are then updated in the LMS algorithm unit 68:

$$\hat{h}_{k+1}^{-1}(n,m) = \hat{h}_k^{-1}(n,m) + \mu r(n,m)e_k(n,m);$$

where μ is the step-size parameter.

These steps are repeated until the estimation error becomes small enough to be acceptable; which value may be predetermined or may be set by a user. As the iterative algorithm converges, the estimated inverse transfer function approaches the correct inverse transfer function h⁻¹(n,m). The inverse transfer function coefficients are the coefficients of the deconvolution filter, and the estimate ŝ(n,m) converges to s(n,m), the correct image, at the same time.

This process may be repeated for the entire image, but it is less complex, and therefore preferable, to find the inverse filter first over a single transfer function support region, then apply it to the entire image r(n,m).

Figure 7:
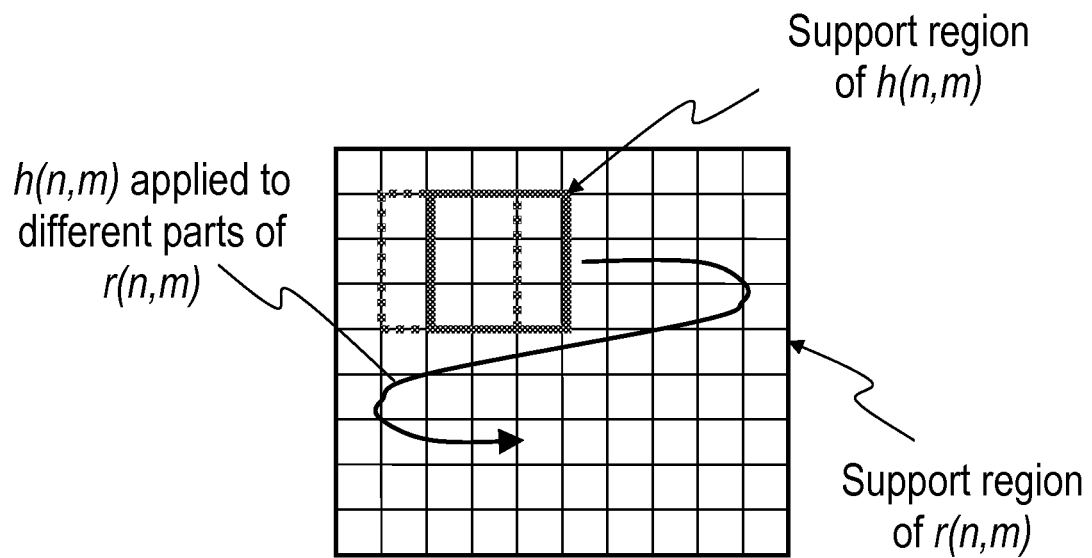
FIG. 7 illustrates support regions of an image r(n,m) and of a transfer function h(n,m), and the transfer function h(n,m) being applied to different parts of the image r(n,m).

While the above steps 1-3 are being repeated, a different portion of the recorded image r(n,m) may be used in each iteration. As in FIG. 7, it should be noted that the recorded image r(n,m) typically has a much larger support region than the transfer function h(n,m) that represents the camera motion. Therefore, the above steps are preferably performed over a support region of h(n,m), and not over the entire image r(n,m), for each iteration.

Although the present apparatus, system and method have been explained with reference to the LMS algorithm, this is by way of example and not by way of limitation. It should be clear to those skilled in the art that there are other iterative algorithms beside the LMS algorithm that may be used to achieve acceptable results, and also that there are equivalent frequency domain derivations of these algorithms. For example, it is possible to write Equation (1) in frequency domain as:

$$R(\omega_1,\omega_2)=S(\omega_1,\omega_2)H(\omega_1,\omega_2); \quad \text{Equation (11)}$$

where $R(\omega_1, \omega_2)$, $S(\omega_1, \omega_2)$, and $H(\omega_1, \omega_2)$ are the frequency domain representations (Fourier Transforms) of the captured image, the correct image, and the transfer function, respectively, and therefore:

$$S(\omega_1, \omega_2) = \frac{R(\omega_1, \omega_2)}{H(\omega_1, \omega_2)}. \quad \text{Equation (12)}$$

To obtain s(n,m) one would calculate $S(\omega_1, \omega_2)$ as above and take the Inverse Fourier Transform, which should be known to those skilled in the art. However, this method does not always lead to well behaved solutions, especially when numerical precision is limited.

Figure 5:
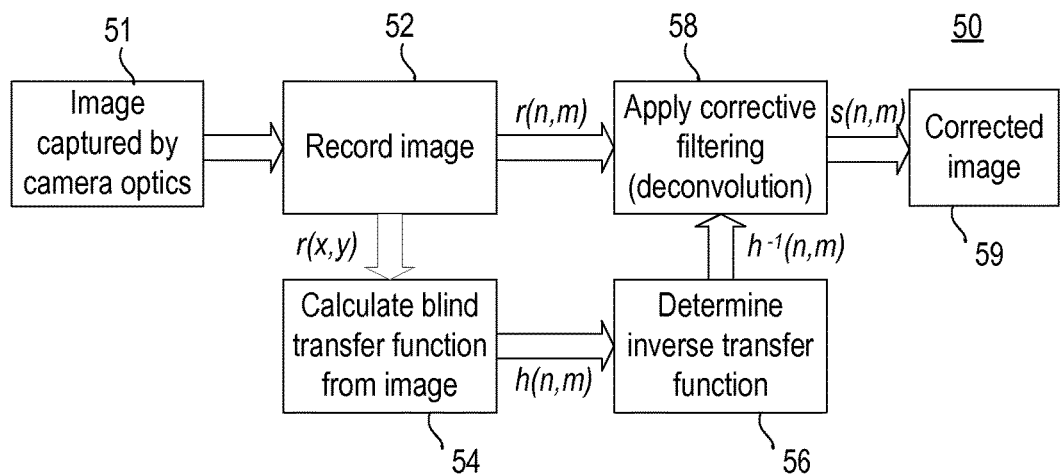
FIG. 5 is a functional block diagram of a system for correcting an image for distortion using a transfer function representing the distortion, wherein the transfer function is derived using blind estimation techniques.

In a second embodiment of the present apparatus, system and method, h(n,m) is not known. This second embodiment uses so-called blind deconvolution, whereby the transfer function h(n,m) is estimated using signal processing techniques. A functional block diagram of this embodiment is illustrated in FIG. 5, wherein a method 50 for correcting image distortion according to this embodiment is shown. An image r(n,m) from the optics from a camera is captured (step 51) and recorded in memory (step 52). Unlike the first embodiment, there are no motion sensors to detect and record camera motion that occurs while the shutter of the camera is open. Instead, the transfer function representing the motion h(n,m) is derived using blind estimation techniques (step 54), and the inverse transfer function $h^{-1}(n,m)$ is determined (step 56). The inverse transfer function is applied in a corrective filter to the image (step 58), which outputs a corrected image s(n,m) (step 59).

Blind equalization techniques are used to obtain the deconvolution filter coefficients. This is also an iterative LMS algorithm, similar to that used in the first embodiment. In this second embodiment, an iterative procedure is also used to compute an approximate deconvolution filter, and the approximation is improved at each iteration until it substantially converges to the ideal solution. As aforementioned with respect to the first embodiment, the level of convergence may be predetermined or may be set by a user. The approximate deconvolution filter is denoted at iteration k as $\hat{w}_k(n,m)$. At this iteration, the output of the deconvolution filter is:

$$y_k(n, m) = \hat{w}_k(n, m) ** r(n, m) \quad \text{Equation (13)}$$
$$= \sum \sum \hat{w}_k(i, j) r(n - i, m - j);$$

The filter output may be written as the sum of the ideal term and the estimation noise as:

$$y_k(n, m) = w(n, m) ** r(n, m) + \quad \text{Equation (14)}$$
$$[\hat{w}_k(n, m) - w(n, m)] ** r(n, m)$$
$$= s(n, m) + v_k(n, m);$$

where $\upsilon(n,m)$ is the estimation noise, which is desirable to eliminate. An initial estimate of the correct image may be written as:

$$\hat{s}_k(n,m) = \hat{w}_k(n,m) ** r(n,m). \quad \text{Equation (15)}$$

Figure 8:
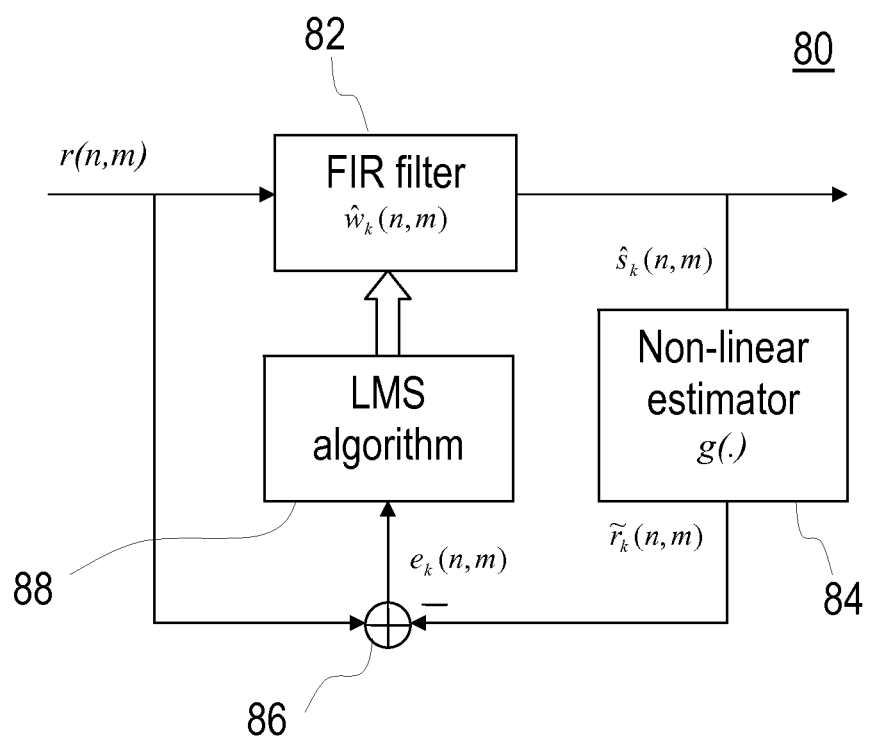
FIG. 8 shows a unit for blind deconvolution to calculate the correct image data.

However, this estimate may be iteratively improved. There are a number of currently known techniques described in estimation theory to achieve this. A preferable option is the LMS algorithm. A block diagram of a calculation unit 80 which implements this method is shown in FIG. 8.

As an initial state, $\hat{h}^{-1}_0(n,m)$ is set equal to $\mu r(n,m)$. Then, the following steps are iteratively repeated:

Step 1, an estimate of the correct image is calculated in a first 2D FIR filter 82:

$$\hat{s}_k(n,m) = \hat{h}_k^{-1}(n,m) ** r(n,m).$$

Step 2, a received signal based on the estimated correct image is calculated in a non-linear estimator 84:

$$\tilde{r}_k(n,m) = g(\hat{s}_k(n,m))$$

and the estimation error is calculated using an adder 86:

$$e_k(n,m) = r_k(n,m) - \tilde{r}_k(n,m).$$

Step 3, the inverse transfer function coefficients are then updated in the LMS algorithm unit 88:

$$\hat{h}_{k+1}^{-1}(n,m) = \hat{h}_k^{-1}(n,m) + \mu r(n,m) e_k(n,m)$$

where $\mu$ is the step-size parameter.

The function g(.) calculated in step 2 is a non-linear function chosen to yield a Bayes estimate of the image data. Since this function is not central to the present method and is well known to those of skill in the art, it will not be described in detail hereinafter.

There are known blind detection algorithms for calculating s(n,m) by looking at higher order statistics of the image data r(n,m). A group of algorithms under this category are called Bussgang algorithms. There are also variations called Sato algorithms, and Godard algorithms. Another class of blind estimation algorithms use spectral properties (polyspectra) of the image data to deduce information about h(n,m). Any appropriate blind estimation algorithm may be used to determine h(n,m), and to construct a correcting filter.

The first two embodiments of the present apparatus, system and method described hereinbefore correct blur in an image based on determining a transfer function that represents the motion of an imager while an image is being captured, and then correcting for the blur by making use of the "inverse" transfer function. One method determines the transfer function at the time the photograph is being captured by using devices that may detect camera motion directly. The other method generates a transfer function after the image is captured by using blind estimation techniques.

Both methods then post-process the digital image to correct for blur. In both cases, the captured image is originally blurred by motion, and the blur is then removed.

Figure 9:
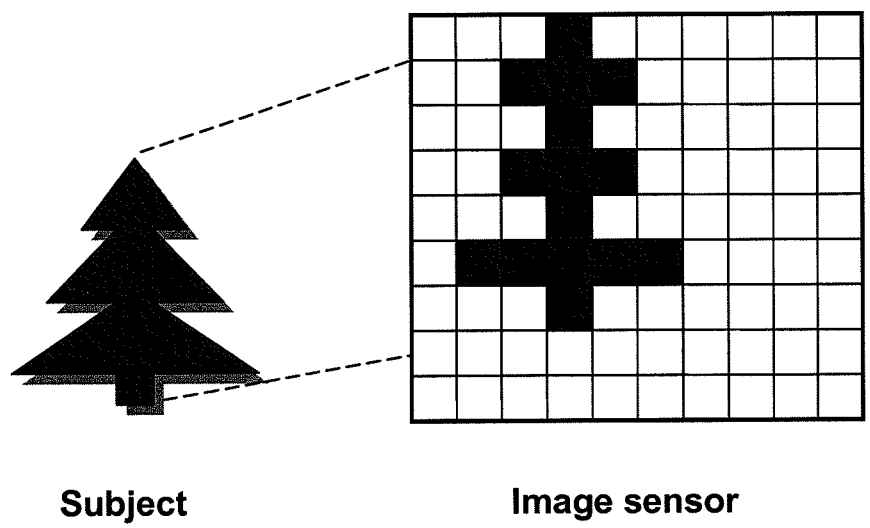
FIG. 9 is an image of an object being captured on an image sensor wherein pixel values represent points of the image.

In accordance with a third embodiment, the blurring of an image is prevented as it is being captured, as described below. When an imager is moved while an image is being captured, multiple copies of the same image are, in effect, recorded over each other. For example, when an image is captured digitally it is represented as pixel values in the sensor points of the image sensor. This is pictorially represented in FIG. 9, in which the imager (for example, a camera and its associated lens) is not shown in order to simplify the depiction.

Figure 10:
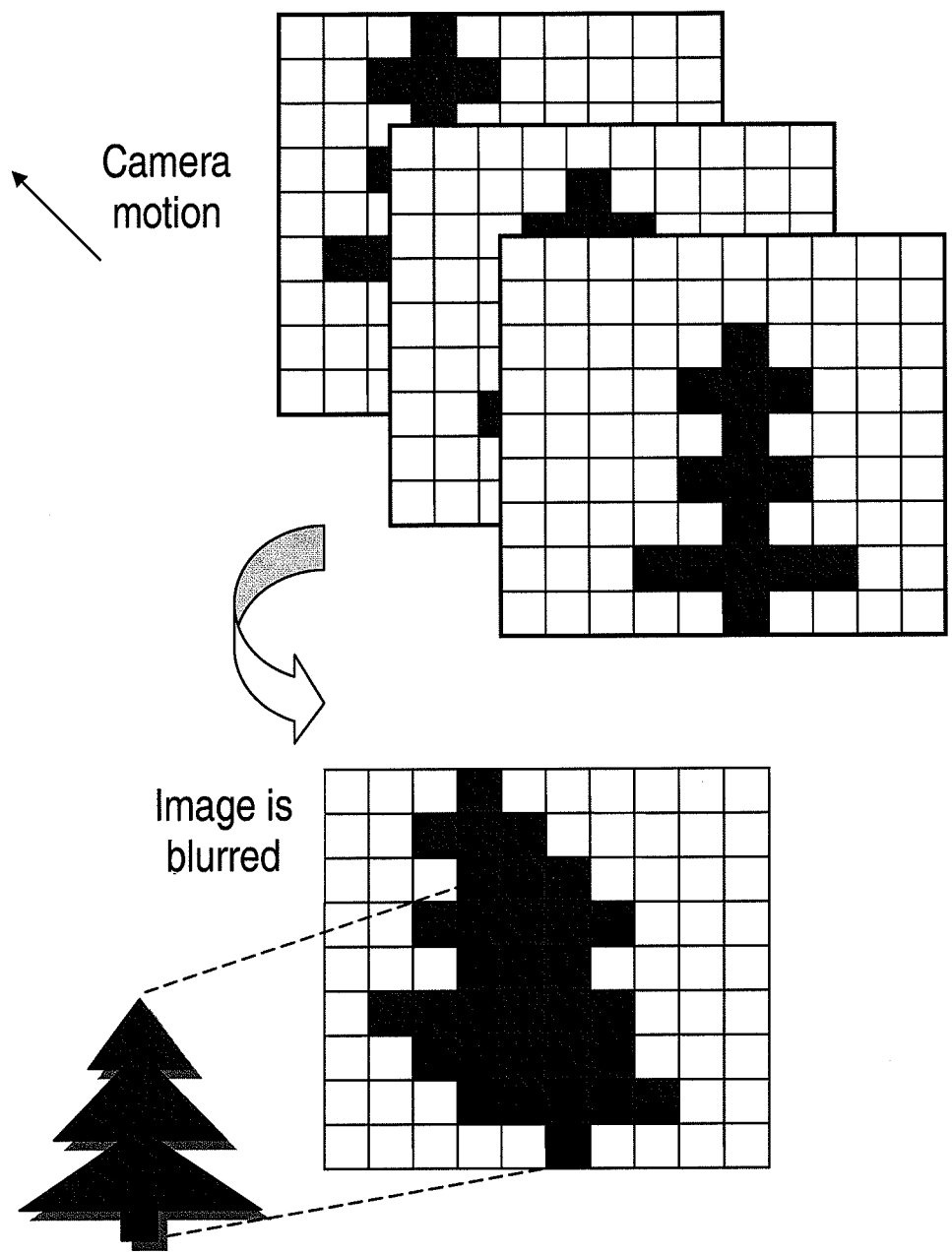
FIG. 10 illustrates the effect of moving an imager while capturing an image, resulting in multiple copies of the image being recorded over each other, causing blur.

If the imager is shaken or moved while the image is being captured, the situation is equivalent to copies of the same image being captured multiple times in an overlapping fashion with an offset. The result is a blurred image. This is particularly true if the shutter speed is relatively slow compared to the motion of the camera. This is graphically illustrated in FIG. 10.

When the shutter speed is sufficiently fast compared to the motion of the imager, blur does not occur, or is very limited, because the displacement of the imager is not large enough to cause the light reflected from a point on the image to fall onto more than one point on the image sensor. This third embodiment takes advantage of the ability of an imager to record multiple images using fast shutter speeds. When an image is being captured using a setting of a relatively slow shutter speed, the imager actually operates at a higher shutter speed (for instance at the fastest shutter speed at which the imager is designed to operate), and captures multiple images "back to back."

Figure 11:
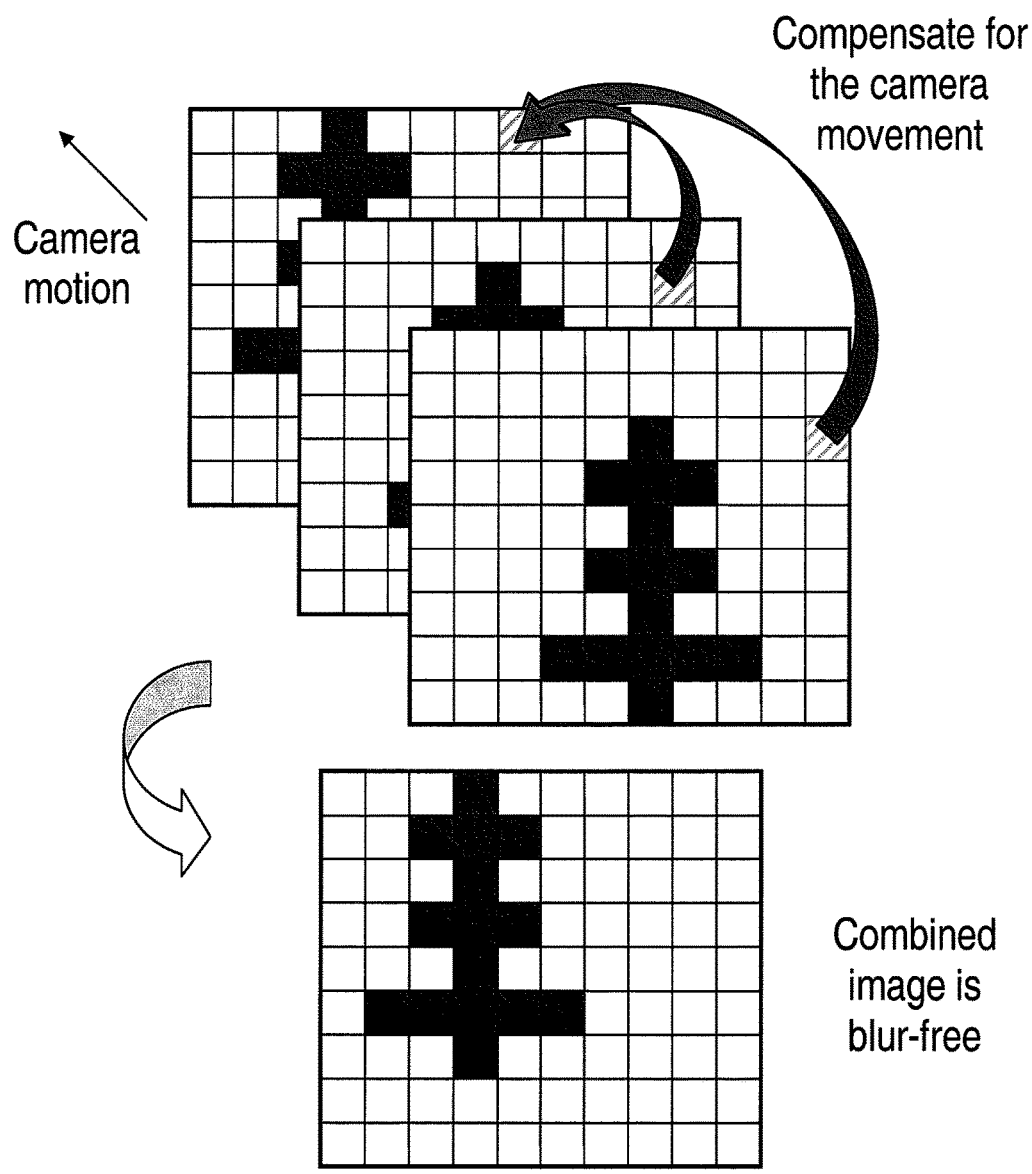
FIG. 11 illustrates combining images taken at fast shutter speeds to result in the equivalent of a final image taken at a slower shutter speed, but with reduced blur.

For example, if the photograph is being taken with a shutter speed setting of $1/125$ sec and the fastest shutter speed of the camera is $1/1000$ sec, the camera actually captures 8 consecutive images, each taken with a shutter speed setting of $1/1000$ sec. Then, the camera combines the images into a single image by aligning them such that each pixel corresponding to the same image point in each image is combined pixel-by-pixel into one pixel value by adding pixel values, averaging them, or using any other appropriate operation to combine them. The multiple images may all be stored and aligned once all of them are captured, or alternatively, each image may be aligned and combined with the first image in "real time" without the need to store all images individually. The blur of the resulting image is substantially reduced, as depicted in FIG. 11.

The quality of an image may be measured in terms of signal-to-noise power ratio (SNR). When a fast shutter speed is used, the SNR of the image is degraded because the image sensor operates less effectively when the amount of light falling on it is reduced. However, since multiple images are being added, this degradation is overcome. Indeed, an SNR improvement may be expected using this embodiment, because the image data is being added coherently while the noise is being added non-coherently. This phenomenon is the basis for such concepts as maximal ratio combining (MRC).

To determine how to align the pixel values, a device that may detect motion, such as an accelerometer or other motion sensor, is attached to or incorporated within the imager, and it records the motion of the imager while the photograph is being taken. The detected motion indicates how much the imager moved while each of the series of images was captured, each image having been captured back-to-back with a high shutter speed as set forth in the example above. The imager moves each of the images in the series by an amount, which is preferably measured in pixels, in the direction opposite the motion of the imager that occurred during the interval between the capture of the first image and each respective image in the series. Thus, the shift of each image is compensated for, and the correct pixels are aligned in each of the images. This is illustrated in FIG. 11. The combined image will not be blurred since there is no spilling of image points into more than one pixel in the combined final image.

As an alternative to the third embodiment, the reference point for aligning the higher speed images is not the imager location, but the subject itself. In other words, higher shutter speed images may be aligned and combined such that a designated subject in a field of view is clear and sharp whereas other parts of the image may be blurred. For example, a moving subject such as a car in motion may be the designated subject. If high shutter speed images are combined such that the points of the image of the moving car are aligned, the image of the car will be clear and sharp, while the background is blurred. As a way to align a designated subject, such as the car in this example, pattern recognition and segmentation algorithms may be used that are well known to those skilled in the art, and defined in current literature.

Alternatively, a tracking signal that is transmitted from the subject may be used to convey its position. Alternatively, the user may indicate, such as by an indicator in a viewfinder, which object in the field of view is the designated subject to be kept blur-free.

Figure 12:
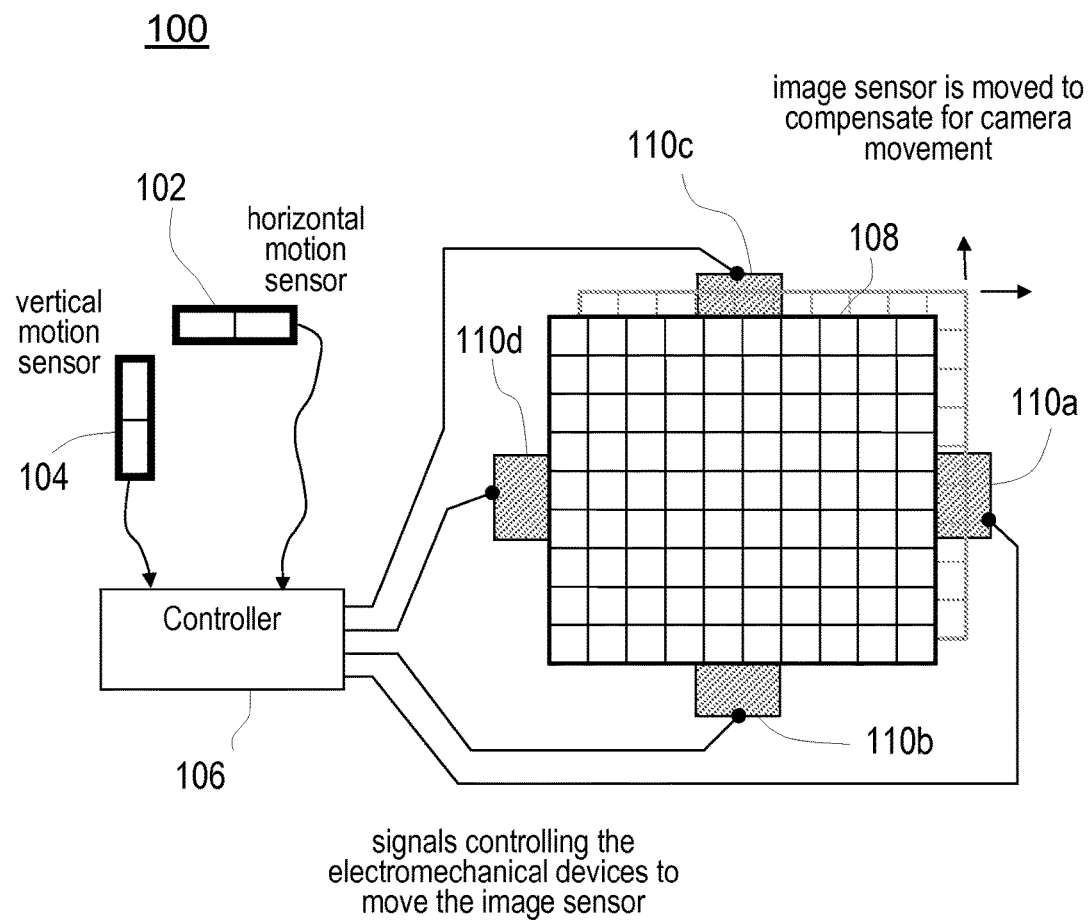
FIG. 12 illustrates a system for image blur correction where an image sensor is moved to compensate for imager movement.

Another embodiment compensates for movement of the imager or the subject by adjusting the position of the image sensor during image capture, according to the inverse of the transfer function describing the imager or subject motion, or both. This embodiment is illustrated in FIG. 12. This embodiment is preferably used in digital cameras wherein the image sensor 108 is a relatively small component and may be moved independently of the camera, but may also be used with film. Accordingly, this embodiment makes use of motion sensors, and detects the movement of the camera and/or the subject while the image is being captured. The signals from the motion sensors are used to control devices that adjust the position of the image sensor. In FIG. 12, horizontal motion sensor 102 and vertical motion sensor 104 measure movement of the camera while its shutter (not shown) is open and an image is being captured. The motion information is conveyed to a controller 106, which determines and sends signals to devices 110a, 110b, 110c, and 110d, which adjust the position of the image sensor 108. The control mechanism is such that the devices 110a-d, for example electromagnets or servos, move the image sensor 108 in the opposite direction of the camera motion to prevent motion blur. Additional sensors (not shown) may be used to detect motion of the subject, and the control mechanism configured to correct for that motion as well.

Figure 13:
FIG. 13 is an example of an image distorted by movement of the imager when the image was captured.
Figure 14:
FIG. 14 is represents the image of FIG. 13 corrected according to the present invention.

FIG. 13 shows an example of a photographic image that is blurred due to user movement of the imager while taking the picture. FIG. 14 shows the same image, corrected according to the present invention. The invention substantially recovers the correct image from the blurred image.

Those skilled in the art will recognize that several embodiments are applicable to digitized images which are blurred by uniform motion, regardless of the source of the image or the source of the motion blur. It is applicable to digital images blurred due to motion of the imager, of the subject, or both. In some cases, it is also applicable to images captured on film and then scanned into digital files. In the latter case, however, motion sensor information typically may not be available, and therefore only the blind estimation embodiment may be used. Also, where appropriate, the different embodiments of the invention may be combined. For example, the superposition embodiment may be used to avoid most blur, and the correcting filter using blind estimation embodiment may then be applied to correct the combined image for any remaining blur.

When the user selects a main subject in the viewfinder in the manner described above, the images captured by the imager are combined such that the main subject is blur-free at the expense of the background. Since this is post-processing and the sequential images are already captured and stored, the user may select another main subject to make blur-free at the expense of the rest of the image and repeat the process for the newly selected main subject as well.

An example application of another embodiment, where multiple images are combined to create a blur-free image, is the all-digital implementation of a graduated filter. A graduated filter reduces the light intensity recorded on the image sensor from parts of the subject. While photographing a high-contrast subject, a graduated filter reduces the light intensity from highlights, thereby reducing the dynamic range "spread" between the shadows and highlights. For example, when photographing a subject with a 5-stop dynamic range (a "stop" indicating a move from one aperture setting to the next one on a camera), a 2-stop graduated filter that is used correctly may reduce the dynamic range down to 3-stops. An imager may mimic the function of a graduated filter by combining multiple images selectively as follows.

Figure 15A:
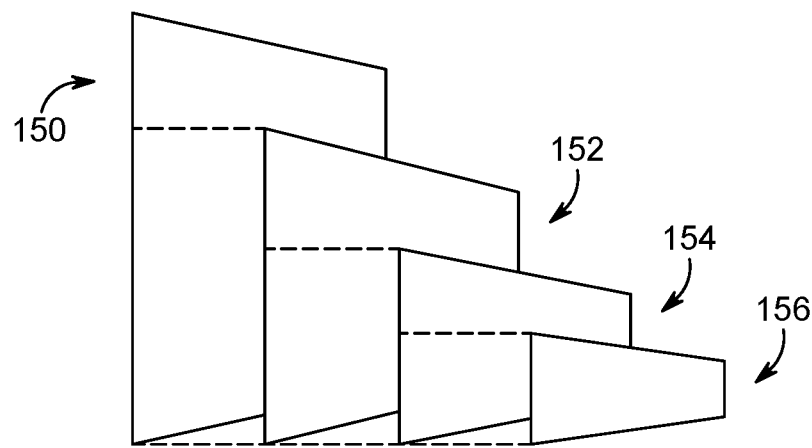
FIGS. 15A-15B illustrate combining of multiple images to implement an all-digital graduated filter.
Figure 15B:
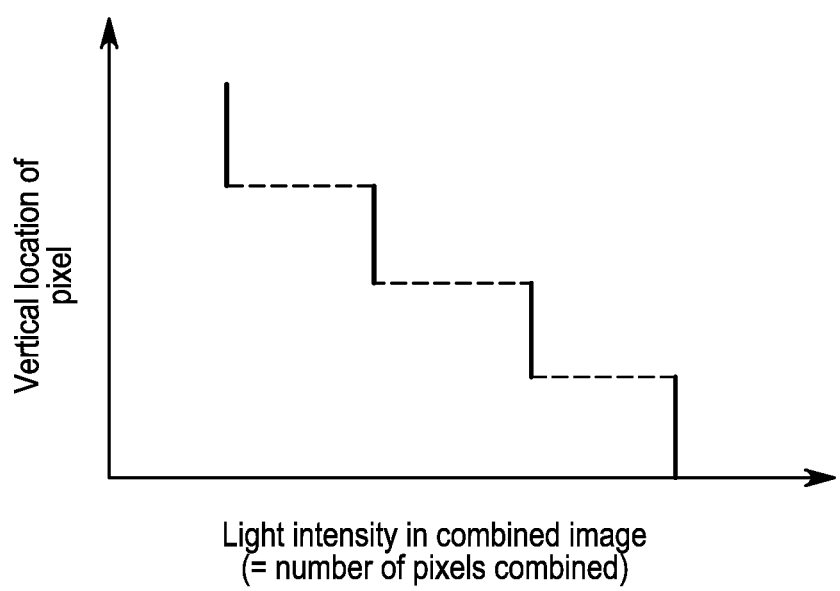

Every image being combined contributes to the light intensity of pixels in the final image. By combining fewer images to form highlights than the number of images combined to form shadows, a final image is created where the dynamic range between shadows and highlights is compressed. FIGS. 15A and 15B are an example of such a graduated filter implementation—effectively attenuating the highlights in the upper part of the subject. FIG. 15A graphically demonstrates that when parts of multiple images 150, 152, 154, and 156, are combined, a vertically graduated filter is created. FIG. 15B graphically demonstrates how the vertically graduated filter created in 15A reduces light intensity on the upper portion of the image. Fewer images are added to create the upper part of the final image, resulting in reduced light intensity.

A user may select a preset graduated filter strength, and select a direction of graduation—for example, transitioning from darker (reduced light intensity) to lighter from top of the image to bottom of the image, or any other direction that the user may select. Since combining of the images may be repeated with different parameters, the user may change the graduated filter selection and obtain a different effect without having to take the picture (multiple pictures) again.

Figure 16:
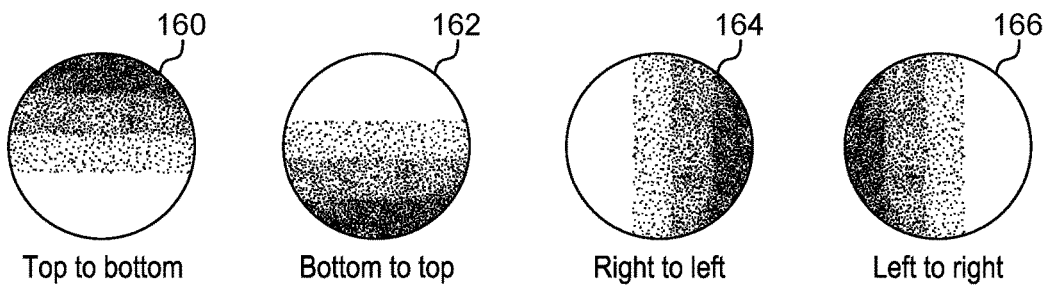
FIG. 16 illustrates a plurality of graduated filters available for selection.

FIG. 16 shows an example selection of graduated filters that may be presented to the user for selection, for example on a viewfinder or a screen, either of which may be touch-sensitive. Graduated filter 160 demonstrates that the darker area of the drawing depicts the light intensity gradually increasing from top to bottom. Graduated filters used in traditional photography are typically made out of glass and they are circular in order to fit in front of a camera lens, moreover the less transparent part of the glass, which is intended to reduce light intensity by allowing less light through, is darker as a result of being more opaque. In the depiction of a graduated filter 160-166, in FIG. 16 an image that mimics the look of a glass graduated filter is used, since this is something familiar to photographers and hence intuitively recognized. Therefore, the darker part of the filter represents less transparency, in other words stronger filtering effect. Light intensity gradually decreasing from top to bottom is demonstrated through graduated filter 162. Graduated filters 164 and 166 decrease light from left to right and right to left, respectively.

Figure 17:
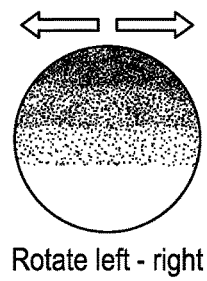
FIG. 17 illustrates a way for selection of orientation of the graduated filter.

FIG. 17 shows another example selection of graduated filter orientation that may be presented to the user. The user may rotate the representative graduated filter image to set the orientation of it, for example on a viewfinder or on a touch-screen display. Separately or on the same representative graduated filter image, the user may also select the "strength" of the graduated filter. The "strength" may be used to mean the amount of light that the digital filter blocks, or in other words, filters out. The stronger the filter, the less light intensity results after the filter. The camera then applies the selected graduated filter orientation and strength when combining multiple images to form the corrected image.

Figure 18A:
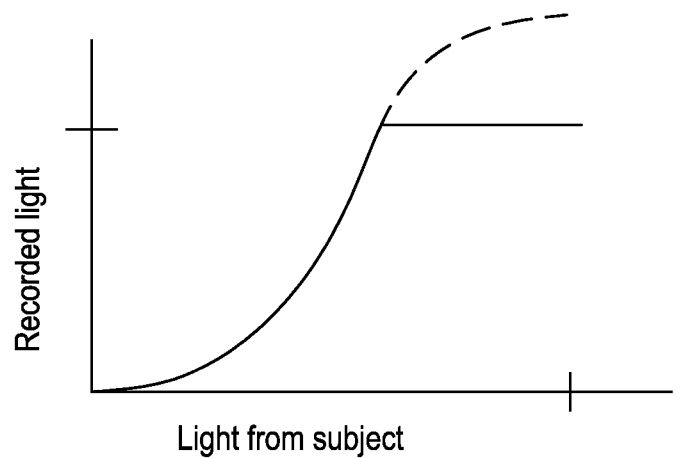
FIG. 18A illustrates how parts of an image may be saturated when a dynamic range is larger than what may be captured with the image sensor.
Figure 18B:
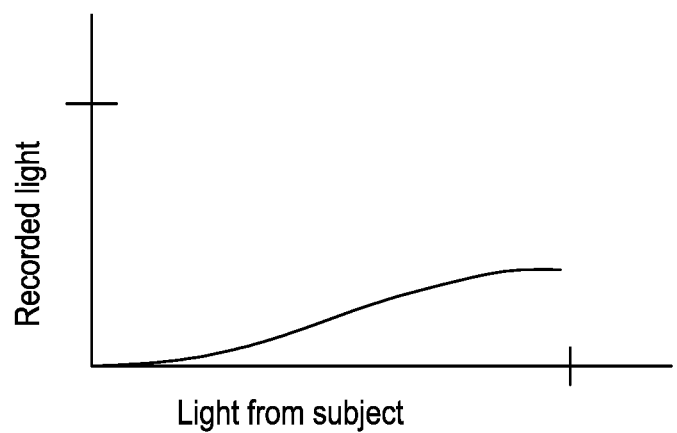
FIG. 18B illustrates how a lower light setting may be used to ensure that the image is not saturated, but with only a portion of the dynamic range of the image sensor being captured.
Figure 18C:
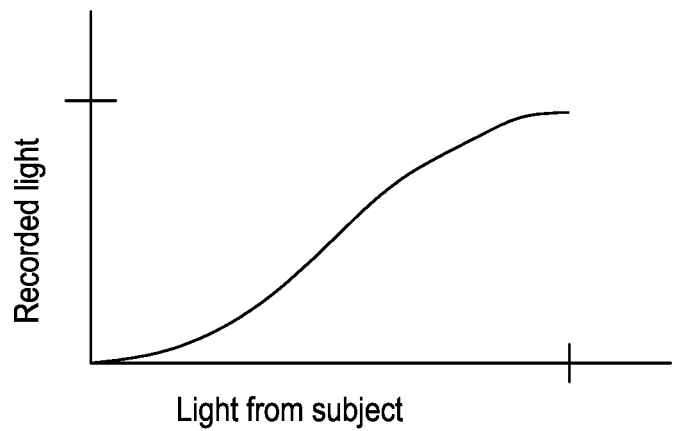
FIG. 18C illustrates combining multiple images to form a final image that takes up the full dynamic range of the image sensor and avoids saturation.

When an image is being captured that represents a dynamic range that is larger than what may be captured with the image sensor, parts of the image become saturated. When this happens, information in the saturated areas from the subject image is lost. This is shown in FIG. 18A. Light intensity beyond a particular value cannot be represented due to the limited dynamic range of the image sensor. In the actual image captured all saturated pixels may appear white, for example. FIG. 18B represents the case where a lower light setting, for example a faster shutter speed, is used and no part of the image is saturated. However, this image is using only a portion of the dynamic range of the image sensor represented on the vertical axis in 18B. Similarly, FIG. 18C represents the case where multiple images are combined, such as those represented in FIG. 18B, to form a final image that takes up the full dynamic range of the image sensor and avoids saturating the sensor.

Figure 18D:
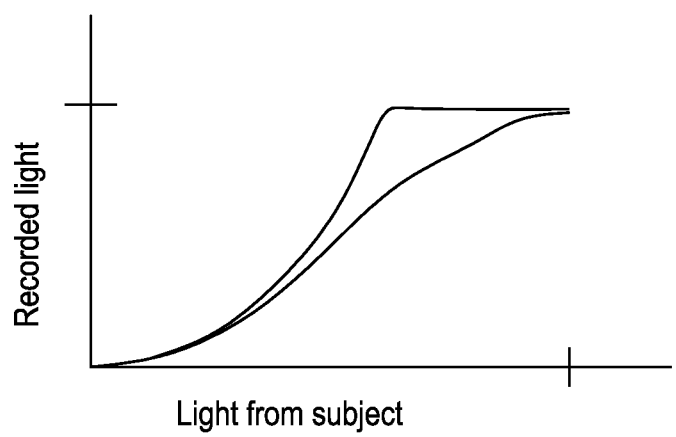
FIG. 18D illustrates the comparison between a case where a large dynamic range subject saturates the image sensor and one where the same subject is recorded multiple times and then selectively combined to form a final image that is not saturated.

Referring to FIG. 18D, a comparison of the case where a large dynamic range subject saturates the image sensor, and the case where the same subject is recorded in multiple images, for example using faster shutter speed, and then combined selectively to form a final image that does not saturate the image sensor is shown.

An alternative embodiment of a graduated filter in accordance with the teachings herein may vary graduation on a pixel-by-pixel basis, rather than in a particular direction. When combining multiple images to create a corrected image with a smaller dynamic range, a graduated filter implementation may combine pixels from fewer of the multiple images for pixels representing highlights, while combining pixels from more of the multiple images for pixels representing shadows. In other words, the graduated filter may work similarly to what is described above and in FIGS. 15A through 18D, except that the number of pixels being added may be adjusted not based on the graduation pattern and graduation level as in FIG. 16 or FIG. 17 but based on the light intensity value of a particular pixel, or groups of similar pixels. This has the effect of compressing the light intensity dynamic range on a pixel-by-pixel basis. This alternative implementation of the graduated filter works better for images where the highlights and shadows of the subject are not localized but appear in multiple places in the image.

Figure 19:
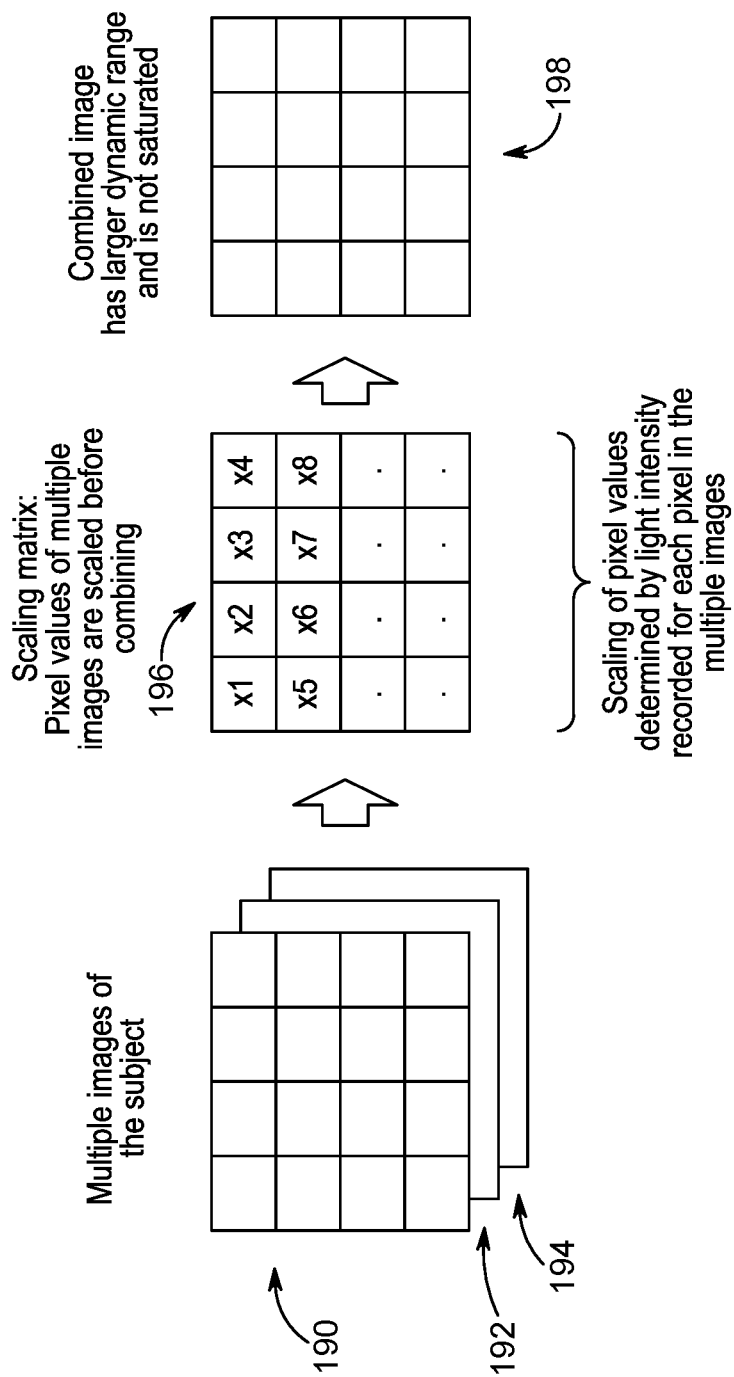
FIG. 19 illustrates scaling of pixel values to create a large dynamic range to avoids saturation.

Alternatively, as shown in FIG. 19, instead of varying the number of pixels combined, pixel values may be scaled to achieve the same effect. By scaling pixel values in highlights such that the light intensity value contributed by each added pixel is smaller, a combined image with compressed dynamic range 198 is created. FIG. 19 describes this type of a graduated filter. Multiple images 190, 192, 194 of the subject are captured, for example using a fast shutter speed, and then multiple images are combined where the light intensity of pixels being combined are scaled using a scaling matrix 196 having a plurality of scaling factors x1, x2, x3, . . . x16. In the example of FIG. 19, the scaling factors 196 are determined based on the light intensity recorded for each pixel. For pixels representing strong highlights and therefore likely to result in saturation of the resulting pixel when multiple images are combined, a smaller scale factor is selected. For example, the light intensity may be represented as a number in the range of 0 to 255. In the example shown in FIG. 19, each pixel of the multiple images 190, 192, 194 will have a light intensity represented by a number between 0 and 255, 0 representing the least and 255 representing the highest intensity. In particular, 0 may represent black, complete lack of light, and 255 may represent white, complete saturation of light. In traditional photography, parts of the image that exhibit lower light values are termed "shadows", and parts of the image that exhibit higher light values are termed "highlights". In the example shown in FIG. 19, if a particular pixel of image 190, for instance the pixel in the left top corner, has a light intensity value, say "23", then even when added up with the same pixel from the images 192 and 194, the final pixel may represent a light intensity around "69", which is well within the range of possible values. On the other hand, if a pixel in image 190 had a light intensity of 125, then once it is combined with the same pixel from images 192 and 194, it may represent a light intensity value around "375", which is larger than the maximum value that may be represented, which is 255. In that case the pixel value in the combined image saturates, meaning reaches the maximum value of 255 and remains there. In the final image that pixel will be rendered as white and will not have any details. However, if one applies the example embodiment herein, upon detecting that the light intensity of the left top pixel of image 190 is "125", a scaling factor of say x1=0.6 in the scaling matrix 196 corresponding to that pixel may be applied. In that case, the light intensity values of that pixel from images 190, 192, and 194 are combined after scaling by 0.6. This would result in a light intensity value of around '225' (0.6*125+0.6*125+0.6*125), which is smaller than the maximum allowed value of 255. The corresponding pixel in the combined image no longer represents saturation, but it renders a meaningful value. Note that in this example, for simplicity, it is assumed that the combining is an arithmetic addition and that the light intensity of the left top pixels in all three images 190, 192, 194 are identical, which may or may not be the case. Also in addition to arithmetic addition, one may devise combining methods that may involve linear or non-linear arithmetic operations and functions. Above example in intended to be illustrative, not limiting.

By adjusting the number of images being combined to form different parts of the resulting image, or by adjusting the scaling factors applied to pixels being combined, one may adjust the strength of the graduated filter—which is the amount of dynamic range compression obtained in the resulting combined image. Below details are given on implementing two specific graduated filters to demonstrate how to create such filters by combining parts of multiple images selectively and by scaling pixel values.

Figure 20:
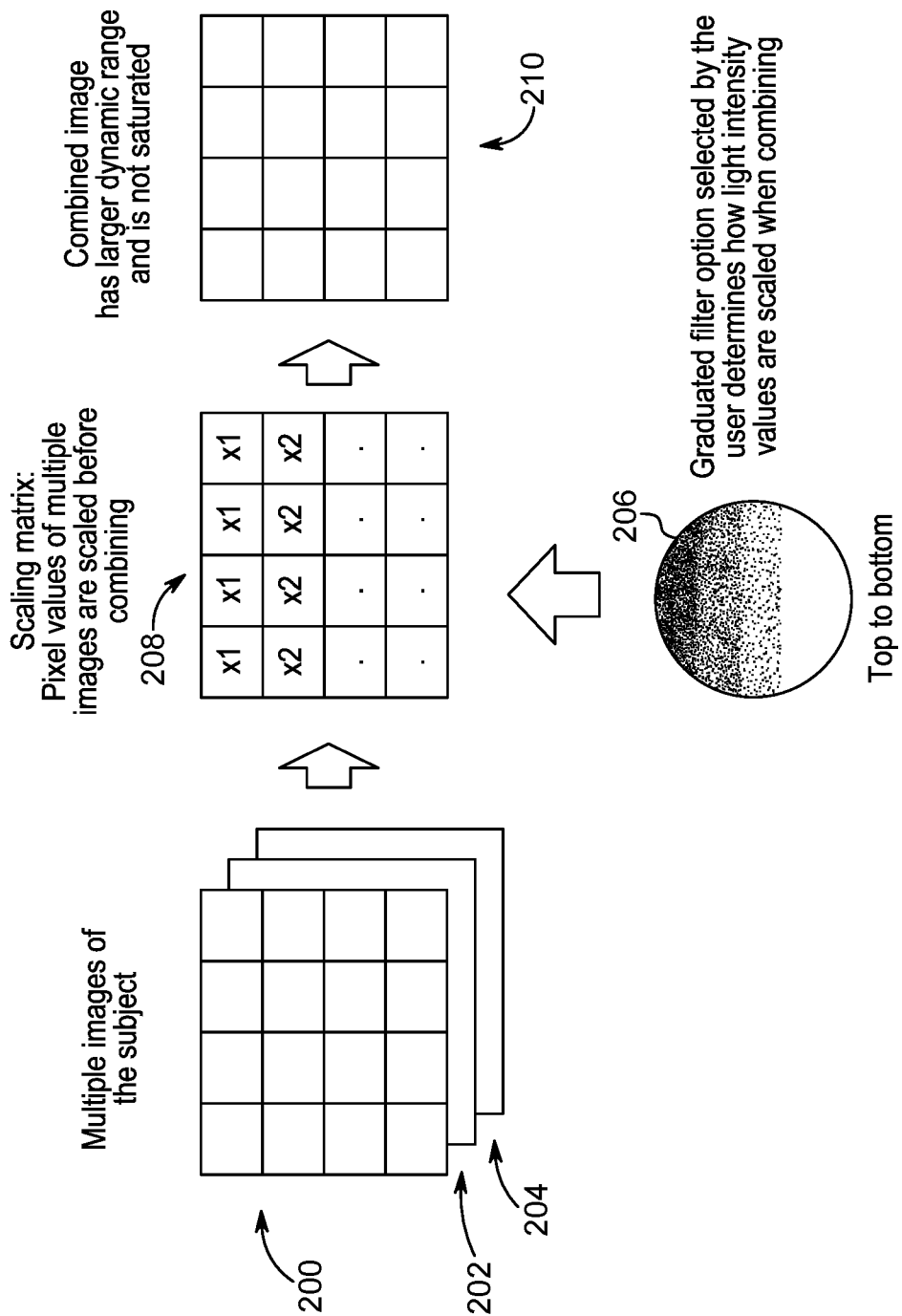
FIG. 20 illustrates a process of capturing multiple images of a subject and selectively decreasing light intensity for by scaling pixel values.
Figure 21:
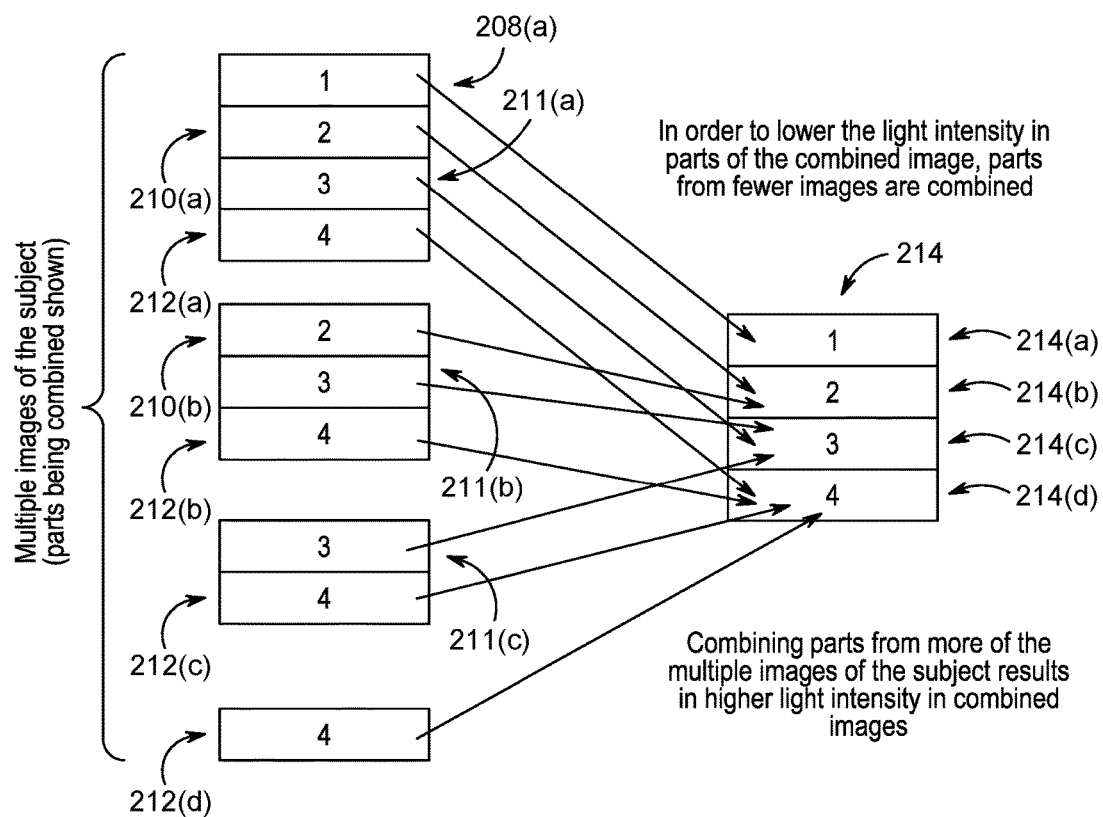
FIG. 21 illustrates a process of selectively combining multiple images.

FIGS. 20 and 21 show example implementations of a "top-to-bottom" graduated filter 206, selected by the user, where light intensity is decreased gradually towards to top of the image.

In FIG. 20, pixels are scaled such that the rows of pixels towards the top of the multiple images have progressively smaller scaling factors applied to them. Accordingly, in FIG. 20, x1<x2< . . . . Multiple images 200, 202 and 204 of the subject are taken, for example using a fast shutter speed, and they are then combined according to the graduated filter 206 type selected by the user. Therefore, scaling factors x1<x2< . . . in order to lower the light value of pixels towards the top of image 208 are used. Hence, the top part of the final combined image 210 is compressed gradually more since the top row is scaled using scaling factor x1, and the second row is scaled using x2, where x1<x2, and so on. In FIG. 21, the same effect is created by combining fewer of the multiple images when forming the pixels towards the top of the image. Assuming the same type of graduated filter is selected by the user as in FIG. 20, when forming the pixel values in the final image, a fewer number of images are combined for rows towards the top of the image, than for the rows toward the bottom of the image.

In FIG. 21, only one image 208(*a*) is used to create the pixels in the first row 214(*a*) of the final image 214, only two images 210(*a*) and 210(*b*) are combined to create pixels in the second row 214(*b*) of the final image 214, three images 211(*a*), 211(*b*) and 211(*c*) are combined to create pixels in the third row 214(*c*) of the final image 214, whereas four images 212(*a*), 212(*b*), 212(*c*) and 212(*d*) are combined to create pixels in the fourth row 214(*d*) in the final image 214. By combining portions from more of the multiple images of the subject, there is a higher light intensity combined in the final image 214.

Figure 22:
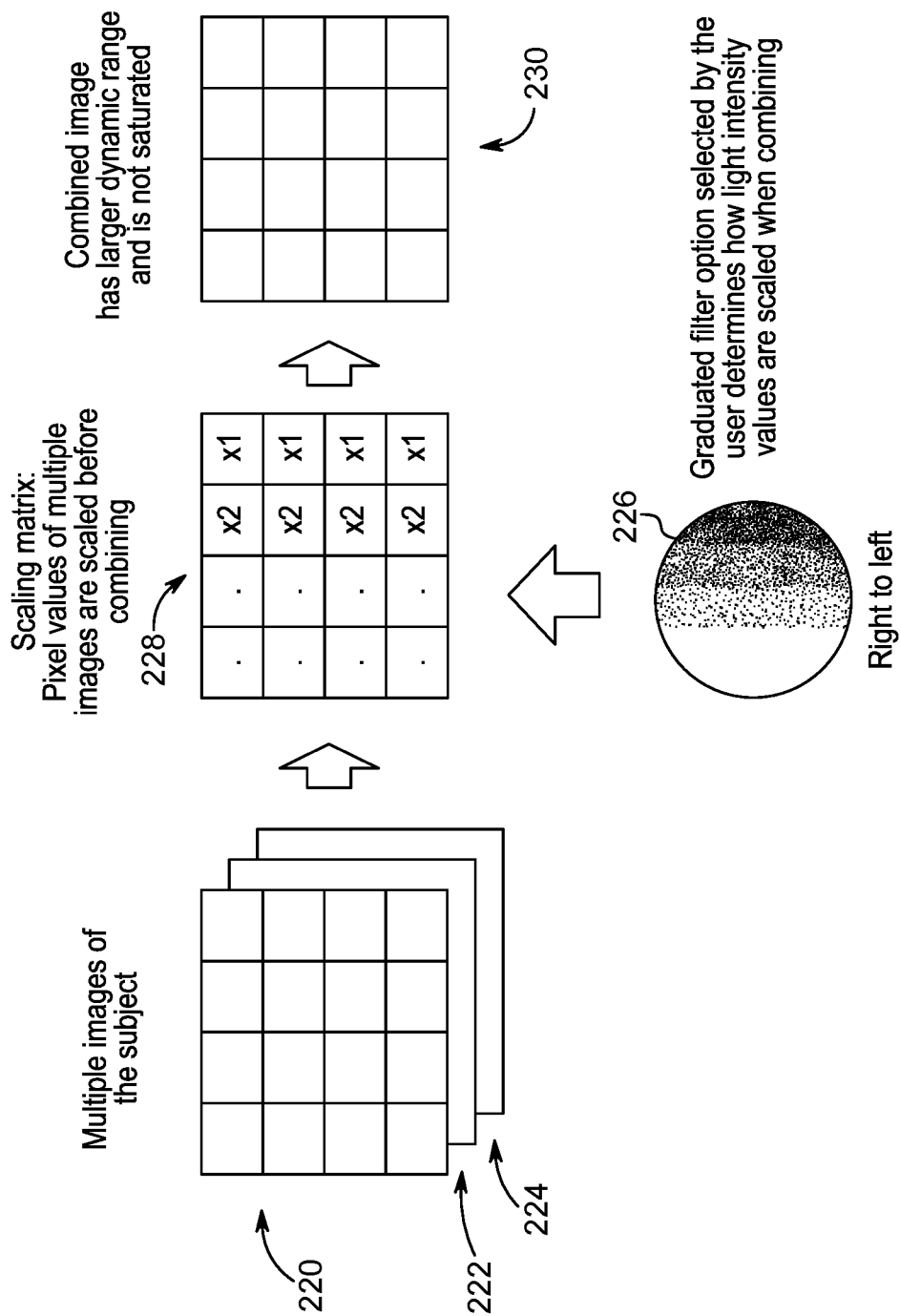
FIG. 22 is an illustration of a process of capturing multiple images of a subject and selectively scaling pixel values.
Figure 23:
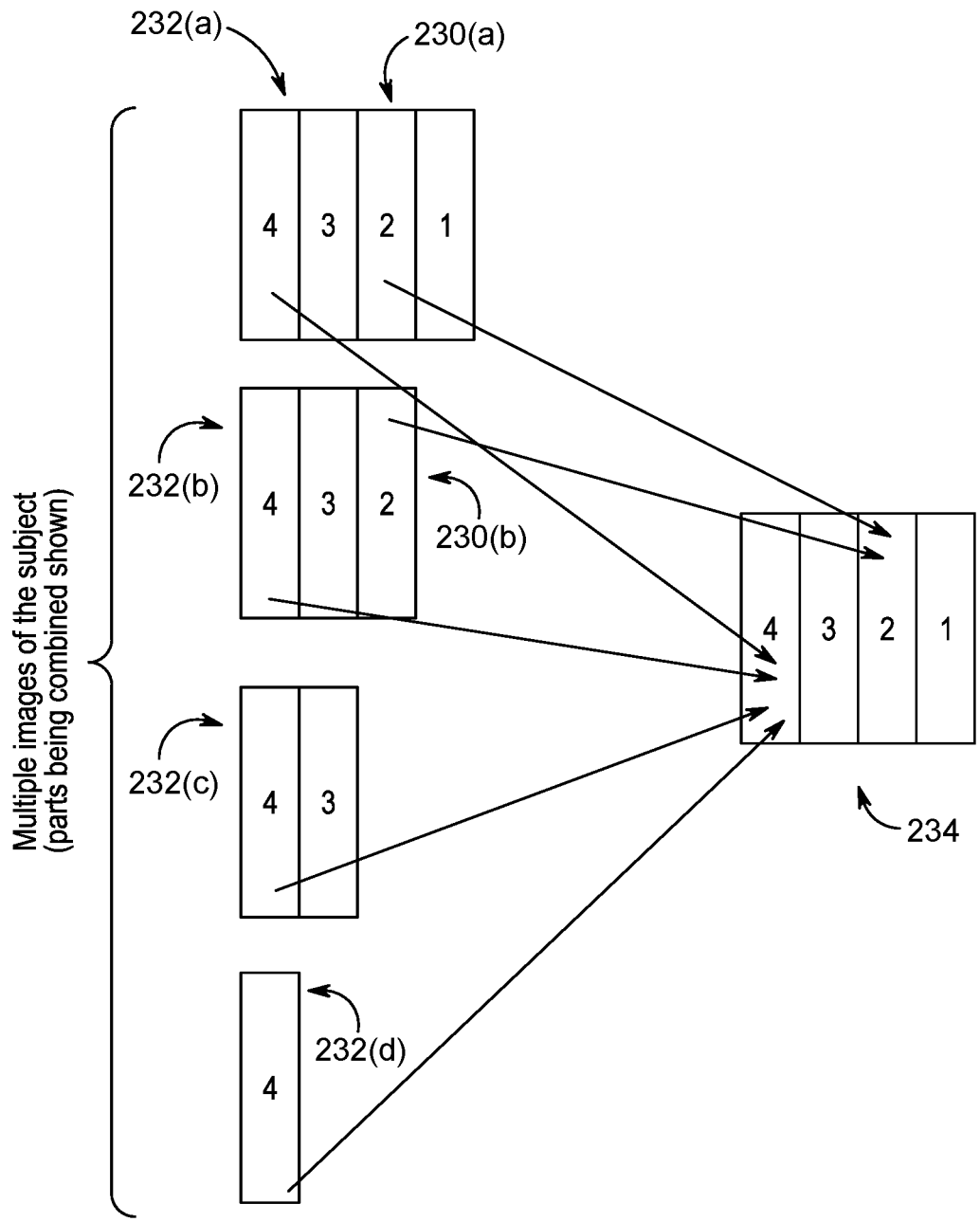
FIG. 23 illustrates a process of selectively capturing multiple images.

A similar example where a right-to-left graduated filter is created where light values are attenuated gradually more towards the right side of the image is shown in FIGS. 22 and 23. In this case, the user selected a right-to-left graduated filter to be applied to the image. In FIG. 22, multiple images 220, 222, and 224 of the subject are taken and then they are combined according to the graduated filter 226 type selected by the user. Therefore, scaling factors x1, x2, . . . in order to lower the light value of pixels towards the right in image 228. Image 230 is created, which has a larger dynamic range and is not saturated. In FIG. 23, the same effect is created by combining fewer of the multiple images when forming the pixels towards the right side of the image. Assuming the same type of graduated filter is selected by the user as in FIG. 22, when forming the pixel values in the final image, fewer numbers of images are combined for rows towards the right side of the image. In FIG. 23, only two images 230*a* and 230*b* are combined to create pixels in column 2 of image 234, whereas four images 232*a*, 232*b*, 232*c*, and 232*d* are combined to create pixels in column 4 in the final image 234.

It should be clear to someone skilled in the art that the alternative implementations of the graduated filter described above may be combined. For example, combining of multiple images may include combining of different number of images to form different parts of the corrected image, while scaling of pixel values may also be employed at the same time. It should also be clear that combining of multiple images may be performed within an imaging device and the corrected combined image may be generated by the imaging device, or the combining may be done outside the imaging device as a post process, such as on a computer or in the cloud. It should also be clear that combining of multiple images may be performed after all of the multiple images for combining are captured, or alternatively multiple images may be combined one at a time as they are each captured.

It should also be clear that combining of multiple images may be performed multiple times with different graduated filter settings, such as a user selecting a graduated filter configuration to obtain a corrected image and then changing the graduated filter configuration to obtain a second corrected image. It should also be clear that the imaging device may include other useful information about the image for presenting it to the user, such as indicating the parts of the image where pixel values are saturated because of strong highlights or deep shadows, thereby indicating how best to use the graduated filter. Other useful information for presentation to the user may include a histogram of the light strength values contained in the image.

In the aforementioned description, no distinction has been made between an imager that captures images one at a time, such as a digital camera, and one that captures sequence of images, such as digital or analog video recorders. A digital video recorder or similar device operates substantially the same way as a digital camera, with the addition of video compression techniques to reduce the amount of image data being stored, and various filtering operations used to improve image quality. The invention is also applicable to digital and analog video capture and processing, being applied to each image in the sequence of images, and may be used in conjunction with compression and other filtering.

The implementation of the apparatus that performs the restoration of the images to their correct form may be done as part of the imager capturing the image, or it may be done as a post-process. When done as part of the imager, the image correcting apparatus may be implemented in an integrated circuit, or in software to run on a processor, or a combination of the two. When done as a post process, a preferred embodiment is that the image data is input into a post processing device such as a computer, and the blind estimation algorithm is performed by a computer program. In this embodiment, the implementation could be a dedicated computer program, or an add-on function to an existing computer program.

Where a computer program performs the image restoration, a blind estimation algorithm may be executed by the program to calculate the estimated transfer function h(n,m). Alternatively, motion information may be recorded by the camera at the time the image is captured, and may be downloaded into the program to be used as an input to calculate h(n,m). In either case, the program then derives the correcting filter and applies the filter to correct the image.

It should also be noted that if there are multiple blurred objects in an image, and the blur is caused by the objects moving in different directions, the image of each object will be blurred differently, each blurred object having a different transfer function describing its motion. The present invention may allow the user to individually select independently blurred parts of the image and individually correct only the selected parts, or alternatively, to correct a selected part of the image at the expense of the rest of the image, resulting in a blur-corrected subject and a blurred background.

When increased accuracy is needed in obtaining h(n,m), those skilled in the art will recognize that, in some cases, the motion information from sensors may be used to calculate h(n,m), and an estimate of h(n,m) may also be calculated by blind estimation and the two transfer functions may be advantageously combined for more accurate results.

There are other signal processing algorithms and digital filters which may be applied to digital images in order to improve their color saturation, reduce noise, adjust contrast and sharpness, etc. These may be incorporated as part of an imager, such as a digital camera, or as part of a post-processing application, such as a photo editing software running on a computer. It should be clear to those skilled in the art that those techniques may be applied in addition to the distortion correction of this invention.

What is claimed is:

1. A method for use in an imaging device for capturing an image of a high-dynamic range subject, the method including:
    displaying a preview of the subject to be captured in a display of the device;
    capturing multiple images of the subject by the device, each image comprising parts of highlights and parts of shadows;
    determining a light intensity dynamic range for parts of the subject;
    determining number of images to be combined to form parts of a final image based, at least in part, on the dynamic range of the parts of the subject;
    combining the multiple images to form a final image, wherein the combining includes the determined number of images to be combined to form different parts of the final image;
    displaying the final image in the display of the device; and
    storing the final image.

2. The method of claim 1, wherein combining multiple images to form a final image includes scaling pixel values in parts of the image using a scaling factor before combining, wherein the scaling factor is based, at least in part, on the light intensity dynamic range determined for the part of the subject.

3. The method of claim 2, wherein the scaling factor used in scaling parts of the image are all the same scaling factor.

4. The method of claim 1, wherein the method includes receiving user input in the display of the device and the combining is based, at least in part, on the user input.

5. The method of claim 1, wherein the combining of the images is done outside the imaging device as a post process.

6. The method of claim 1, wherein the imaging device presents a user information about highlights and shadows of the subject.

7. The method of claim 1, wherein the combining includes calculating pixel values for an image point in the final image based on pixel values for the image point in the multiple images being combined.

8. An imaging device for capturing an image of a high-dynamic range subject, the device including:
    a display configured to display a preview of the subject to be captured;
    a lens and an image sensor configured to capture multiple images of the subject, wherein each image comprises parts of highlights and parts of shadows;
    a processor configured to:
    determine a light intensity dynamic range for parts of the subject;
    determine number of images to be combined to form parts of a final image based, at least in part, on the dynamic range of the parts of the subject; and
    combine the multiple images to form a final image, wherein the combining includes combining the determined number of the images to form different parts of the final image;
    the display further configured to display the final image; and
    a memory configured to store the final image.

9. The device of claim 8, wherein the processor is configured to combine multiple images to form a final image after scaling pixel values in parts of the image using a scaling factor, wherein the scaling factor is based, at least in part, on the light intensity dynamic range determined for the part of the subject.

10. The device of claim 9, wherein the processor is configured to use the same scaling factor in scaling parts of the image.

11. The device of claim 8, wherein the display is configured to receive a user input and the processor is configured to perform the combining based, at least in part, on the user input.

12. The device of claim 8, wherein the device is configured to output the multiple images so that the combining of the images is done outside the imaging device as a post process.

13. The device of claim 8, wherein the processor is configured to present a user information in the display of the device about highlights and shadows of the subject.

14. The device of claim 8, wherein the processor is configured to combine the multiple images by calculating pixel values for image points in the final image based on pixel values for the image points in the multiple images being combined.

15. A method for use in an imaging device for capturing an image of a high-dynamic range subject, the method including:
　displaying a preview of the subject to be captured in a display of the device;
　capturing multiple images of the subject in an imaging device;
　determining a light intensity dynamic range for parts of the subject;
　calculating scaling factors for parts of the subject based, at least in part, on the dynamic range of the parts of the subject;
　combining the multiple images to form a final image, wherein the combining includes processing pixel values with the scaling factors calculated;
　displaying the final image in the display of the device; and
　storing the final image.

16. The method of claim of 15, wherein the pixel values are processed with different scaling factors to form different parts of the final image.

17. The method claim of 15, wherein the pixel values are processed with the same scaling factor to form different parts of the final image.

18. The method of claim 15, wherein the method includes receiving user input in the display of the device and the combining is based, at least in part, on the user input.

19. The method of claim 15, wherein the combining of the images is done outside the imaging device as a post process.

20. The method of claim 15, wherein the imaging device presents a user information about highlights and shadows of the subject.

* * * * *